(12) United States Patent
Senthil Nayakam et al.

(10) Patent No.: US 11,188,338 B2
(45) Date of Patent: Nov. 30, 2021

(54) CONTEXT VALUE RETRIEVAL PRIOR TO OR PARALLEL WITH EXPANSION OF PREVIOUS SYMBOL FOR CONTEXT-DECODING IN RANGE DECODER

(71) Applicant: Fungible, Inc., Santa Clara, CA (US)

(72) Inventors: Gurumani Senthil Nayakam, Milpitas, CA (US); Satyanarayana Lakshmipathi Billa, Sunnyvale, CA (US); Rajan Goyal, Saratoga, CA (US)

(73) Assignee: Fungible, Inc., Santa Clara, CA (US)

( * ) Notice: Subject to any disclaimer, the term of this patent is extended or adjusted under 35 U.S.C. 154(b) by 48 days.

(21) Appl. No.: 16/440,689

(22) Filed: Jun. 13, 2019

(65) Prior Publication Data
US 2020/0394066 A1    Dec. 17, 2020

(51) Int. Cl.
G06F 9/38    (2018.01)
G06F 9/30    (2018.01)

(52) U.S. Cl.
CPC ........ G06F 9/3822 (2013.01); *G06F 9/30025* (2013.01); *G06F 9/3832* (2013.01)

(58) Field of Classification Search
CPC ...... G06F 9/461; G06F 9/3822; G06F 9/3832; G06F 9/30025; H03M 7/00; H03M 7/425; H03M 7/4006; H03M 7/4018; H03M 7/3088; H04N 19/13; H04N 19/42; H04N 19/44
USPC .......................................................... 341/51
See application file for complete search history.

(56) References Cited

U.S. PATENT DOCUMENTS

| | | | |
|---|---|---|---|
| 9,287,893 B1 * | 3/2016 | Pflederer | H03M 7/6029 |
| 9,363,339 B2 * | 6/2016 | Bhaskar | H03M 7/30 |
| 9,825,648 B1 * | 11/2017 | Gopal | G06F 3/0673 |
| 9,853,660 B1 * | 12/2017 | Gopal | H03M 7/3086 |
| 10,224,957 B1 * | 3/2019 | Cassetti | G06F 16/24568 |
| 10,540,288 B2 | 1/2020 | Noureddine et al. | |
| 2006/0022848 A1 * | 2/2006 | Nomura | H03M 7/4006 341/50 |
| 2006/0220927 A1 * | 10/2006 | Park | H03M 7/4006 341/50 |
| 2010/0079311 A1 * | 4/2010 | Sluiter | H03M 7/3086 341/51 |
| 2011/0154169 A1 * | 6/2011 | Gopal | H03M 7/40 714/807 |

(Continued)

OTHER PUBLICATIONS

Deutsch, "DEFLATE Compressed Data Format Specifications Version 1.3," RFC 1951, Network Working Group, May 1996, 15 pp.

*Primary Examiner* — William B Partridge
*Assistant Examiner* — Courtney P Carmichael-Moody
(74) *Attorney, Agent, or Firm* — Shumaker & Sieffert, P.A.

(57) ABSTRACT

A highly programmable device, referred to generally as a data processing unit, having multiple processing units for processing streams of information, such as network packets or storage packets, is described. The data processing unit includes one or more specialized hardware accelerators configured to perform acceleration for various data-processing functions. This disclosure describes examples of retrieving values represented by one or more previous symbols needed for decoding a current symbol before or in parallel with the insertion of the values represented by the one or more previous symbols in the data stream.

20 Claims, 9 Drawing Sheets

(56) References Cited

U.S. PATENT DOCUMENTS

| | | | |
|---|---|---|---|
| 2011/0307659 A1* | 12/2011 | Hans | G06F 3/0613 |
| | | | 711/114 |
| 2014/0292546 A1* | 10/2014 | Tseng | H03M 7/4012 |
| | | | 341/51 |
| 2015/0095663 A1* | 4/2015 | Seng | G06F 12/1408 |
| | | | 713/193 |
| 2015/0109153 A1* | 4/2015 | Wu | H03M 7/40 |
| | | | 341/65 |
| 2018/0287965 A1 | 10/2018 | Sindhu et al. | |
| 2018/0293168 A1 | 10/2018 | Noureddine et al. | |
| 2019/0012278 A1 | 1/2019 | Sindhu et al. | |
| 2019/0013965 A1 | 1/2019 | Sindhu et al. | |
| 2019/0158428 A1 | 5/2019 | Gray et al. | |
| 2019/0340490 A1* | 11/2019 | Fishel | G06N 3/04 |
| 2020/0249948 A1* | 8/2020 | Giamei | G06F 9/30145 |

\* cited by examiner

| offset | 0 | 1 | 2 | 3 | 4 | 5 | ... |
|---|---|---|---|---|---|---|---|
| Un-compressed bytes | u | p | u | n | e | p | ... |

| Letter | Frequency | Interval |
|---|---|---|
| 'u' | 60 | [0,0.6) |
| 'p' | 20 | [0.6,0.8) |
| 'n' | 10 | [0.8,0.9) |
| 'e' | 10 | [0.9,1.0) |

CONTEXT VALUE RETRIEVAL PRIOR TO OR PARALLEL WITH EXPANSION OF PREVIOUS SYMBOL FOR CONTEXT-DECODING IN RANGE DECODER

TECHNICAL FIELD

The disclosure relates to processing packets of information, for example, in the fields of networking and storage.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern network and can be relatively poor at performing packet stream processing.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more specialized hardware-based accelerators configured to perform acceleration for various data-processing functions, thereby offloading tasks from the processing units.

This disclosure describes a hardware-based range decoder circuit for performing context-based range decoding of a data stream. As described in more detail, values that are to be inserted into one or more previous packets (e.g., to expand the one or more previous packets) and are needed for decoding a current packet are retrieved prior to or in parallel with the insertion of the values into the one or more previous packets, allowing for decoding of the current packet before or in parallel with the insertion of the values into the one or more previous packets. In one or more examples described in this disclosure, packets refers to an encoded symbol.

In context-based range decoding, context values define which probability values to use for determining values (e.g., ones or zeros) of bits of a packet. In some examples, the context values used for decoding a current packet are values in one or more previous packets. Accordingly, the context values for decoding the current packet may not be known until the values in the one or more previous packets are inserted into the one or more previous packets (i.e., one or more previous packets are expanded). For example, a decoder circuit generates one or more pointer values that identify locations within a memory where values in the one or more previous packets are to be stored after the values have been inserted into the one or more previous packets (i.e., after the one or more previous packets are expanded).

However, the values that are to be inserted into the one or more previous packets (e.g., to expand the pervious packets) are already stored within different locations within the memory. For instance, to insert values into the one or more previous packets, an expander circuit retrieves values from a first set of one or more locations in the memory, inserts the values to expand the one or more previous packets, and re-stores the values into a second set of one or more locations in the memory. In this example, the second set of one or more locations in the memory may be the one or more pointer values that the decoder circuit generated to identify locations in the memory from where to retrieve the context values used for decoding the current packet.

In accordance with examples described in this disclosure, one or more pointer conversion circuits are configured to convert the one or more pointer values to one or more converted pointer values. The converted pointer values identify locations in the memory from where to retrieve context values used for decoding the current packet. For instance, keeping with the previous example, the decoder circuit generates one or more pointer values that identify the second set of one or more locations in the memory. The one or more pointer conversion circuits may convert the one or more pointer values to one or more converted pointer values that identify the first set of one or more locations in the memory. As described above, the first set of one or more locations in the memory store values that are used to expand the one or more previous packets (e.g., insert the values or fill in the values of the one or more previous packets), and then these values are re-stored in the second set of one or more locations in the memory.

By retrieving the context values for decoding a current packet from the one or more previous packets before or in parallel with the expansion of the one or more previous packets, the decoder circuit may be configured to start decoding the current packet before the one or more previous packets are expanded. Accordingly, the example techniques described in this disclosure may reduce decoding latency with a practical application of determining from where to retrieve values that are eventually used to expand one or more previous packets before or in parallel with the expansion of the one or more previous packets so that the retrieved values can be used to start the decoding of a current packet.

In one example, the disclosure describes an integrated circuit for context-coding, the integrated circuit comprising a range decoder circuit comprising a history buffer configured to store values represented by symbols in a data stream, an expander circuit configured to insert the stored values into the data stream to expand the symbols in the data stream, a decoder circuit configured to decode a current symbol of the data stream based on values represented by one or more previous symbols that are prior to the current symbol in the data stream, and one or more pointer conversion circuits configured to determine one or more locations within the history buffer that store the values represented by the one or more previous symbols of the data stream prior to or in parallel with the expander circuit inserting the values represented by the one or more previous symbols into the data stream, wherein the decoder circuit is configured to receive, from the history buffer, the values represented by the one or more previous symbols based on the locations within the history buffer determined by the one or more pointer conversion circuits.

In one example, the disclosure describes a method for context-coding with an integrated circuit, the method comprising storing, with a history buffer of the integrated circuit, values represented by symbols in a data stream, decoding, with a decoder circuit of the integrated circuit, a current symbol of the data stream based on values represented by one or more previous symbols that are prior to the current symbol in the data stream, wherein decoding the current symbol comprises, prior to or in parallel with an expander circuit inserting the values represented by the one or more previous symbols into the data stream, receiving, from the history buffer, the values represented by the one or more previous symbols, and determining, with one or more pointer conversion circuits, one or more locations within the history buffer that store the values represented by the one or more previous symbols of the data stream, wherein receiving, from the history buffer, the values represented by the one or more previous symbols comprises receiving, from the history buffer, the values represented by the one or more previous symbols based on the determined locations within the history buffer, and inserting, with the expander circuit, the values represented by the one or more previous symbols into the data stream to expand the one or more previous symbols.

The details of one or more examples are set forth in the accompanying drawings and the description below. Other features, objects, and advantages of the invention will be apparent from the description and drawings, and from the claims.

DETAILED DESCRIPTION

Figure 1:
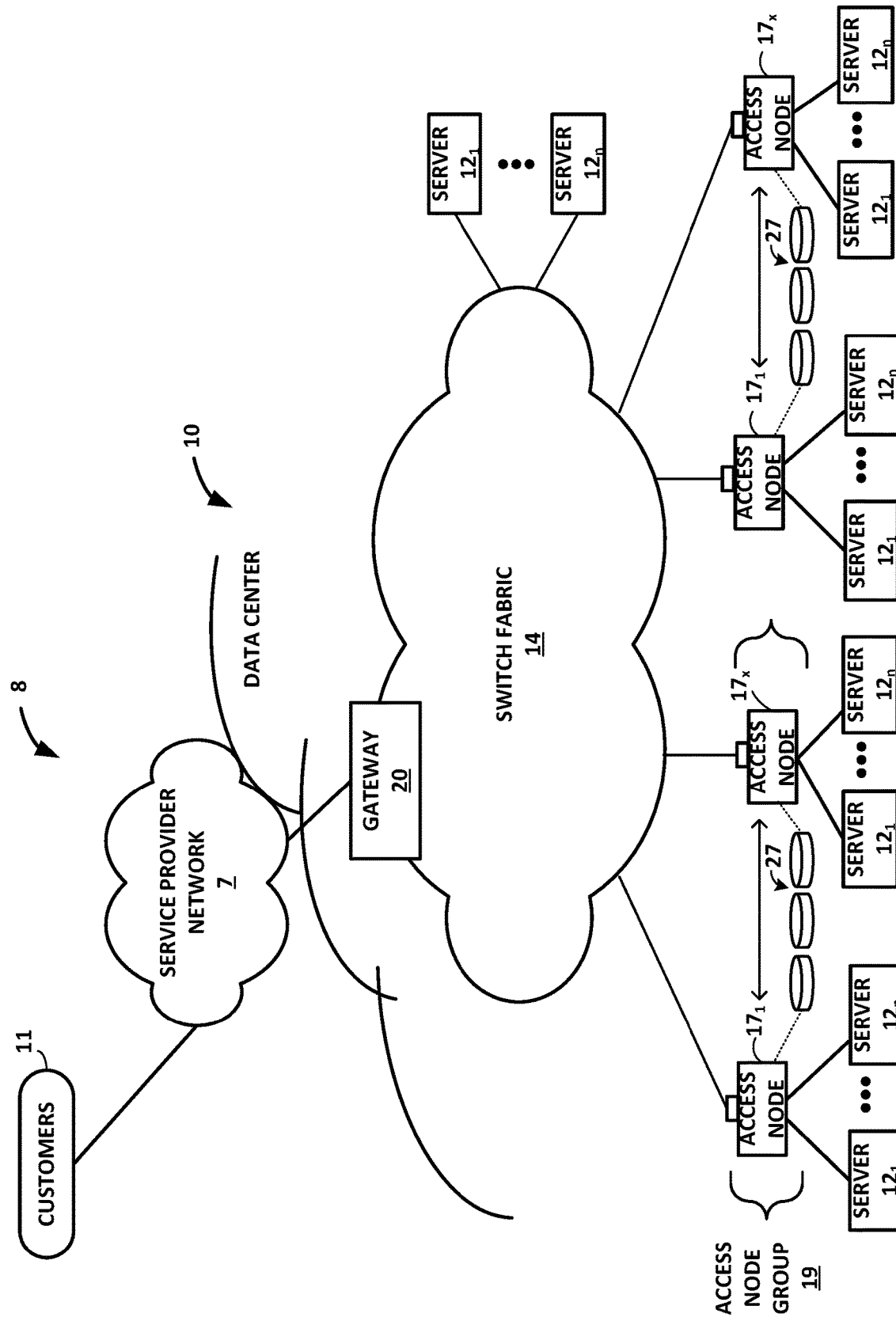
FIG. 1 is a block diagram illustrating an example system including one or more network devices configured to efficiently process a series of work units in a multiple core processor system.

FIG. 1 is a block diagram illustrating an example system 8 including one or more network devices configured to efficiently process a series of work units in a multiple core processor system. As described herein, techniques for parallel decoding variable-length encoded data may provide technical benefits that include improving the throughput and utilization of processing cores within access nodes 17 in FIG. 1.

Access nodes 17 may also be referred to as data processing units (DPUs), or devices including DPUs, in this disclosure. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet. In other examples, content/service provider network 107 may be a data center wide-area network (DC WAN), private network or other type of network.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17_x$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19, including its set of access nodes 17 and storage devices 27, and the set of servers 12 supported by the access nodes 17 of that access node group 19 may be referred to herein as a network storage compute unit.

As further described herein, in one example, each access node 17 is a highly programmable I/O processor (referred to as a DPU) specially designed for offloading certain functions from servers 12. In one example, each access node 17 includes a number of internal processor clusters, each including two or more processing cores and equipped with hardware engines that offload cryptographic, compression and decompression, and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Additional example details of various example DPUs are described in U.S. Patent Publication No. 2019/0013965 issued as U.S. Pat. No. 10,659,254, entitled "Access Node for Data Centers," and U.S. Patent Publication No. 2019/0012278, entitled "Data Processing Unit for Computing Devices," the entire contents of both being incorporated herein by reference.

In accordance with the techniques of this disclosure, any or all of access nodes 17 may include a data compression/decompression accelerator unit. That is, one or more computing devices may include an access node including one or more data compression/decompression accelerator units, according to the techniques of this disclosure.

The data compression/decompression accelerator unit of the access node may be configured to process payloads of packets during various services as the packets are exchanged by access nodes 17, e.g., between access nodes 17 via switch fabric 14 and/or between servers 12. That is, as packets are exchanged between the devices, either for networking or for data storage and retrieval, the access node may perform data compression on payloads of the packet. For example, the access node may use one or more data compression/decompression accelerator units to perform dictionary-based or history-based compression followed by entropy encoding.

In addition to history/dictionary-based compression followed by entropy encoding, the data compression/decompression accelerator unit may be configured to perform the inverse process of entropy decoding followed by history/dictionary-based decompression to reconstruct the original payloads of packets. One example of entropy encoding and entropy decoding is range encoding and range decoding. For example, the data compression/decompression accelerator unit includes a range encoder and a range decoder configured to perform range encoding or decoding.

Range encoding or decoding is used to compress or decompress bits used to represent a symbol. A symbol is the item that is being compressed or decompressed. For example, the symbol may be a literal (e.g., a literal of a byte string) or a length, distance pair indicating a distance value to a previous occurrence of a matching byte string and a length value of the match. Examples of the symbols are described in more detail below. Other examples of symbols exist, and the techniques should not be considered limited to these examples of symbols.

In one example technique for range encoding and decoding, such as context-free range coding, for each symbol (e.g., literal or length, distance pair) there is a frequency value indicative of the frequency at which the symbol occurs in the payload and an interval range based on its frequency. As one example, more frequent symbols are assigned larger interval ranges in a range space, than less frequent symbols. An interval range in a range space of a symbol may generally correspond to how frequent the symbol is in the payload. As an example, assume a first symbol is 60% of the symbols, a second symbol is 20% of the symbols, a third symbol is 10% of the symbols, and a fourth symbol is 10% of the symbols. In this example, assume the range space is set to be 0 to 1. The first symbol may then be assigned a sub-portion of the range space such as range of 0 to 0.6, the second symbol may be assigned a sub-portion of the range space such as range of 0.6 to 0.8 (either range for the first symbol or the second symbol includes 0.6, not both), the third symbol may be assigned a sub-portion of the range space such as range of 0.8 to 0.9 (either range for the second symbol or the third symbol includes 0.8, not both), and the fourth symbol may be assigned a sub-portion of the range space such as a range of 0.9 to 1 (either range for the third symbol or the fourth symbol includes 0.9, not both). The value range assigned to each symbol is proportional to the percentage of their occurrence in the payload.

If a starting symbol in the payload happens to be the first symbol, then the range coder (encoder or decoder) sets a value of 0.6 (e.g., reduces the range to [0, 0.6] from [0, 1]). Then, for the next symbol, the range coder divides the range from 0 to 0.6. For example, the first symbol is assigned the range of 0 to 0.36 because 0.6*60% is 0.36. The second symbol is assigned the range of 0.36 to 0.48 because 0.6*20% plus 0.36 is 0.48. The third symbol is assigned the range of 0.48 to 0.54 because 0.6*10% plus 0.48 is 0.54. The fourth symbol is assigned the range of 0.54 to 0.6 because 0.6*10% plus 0.54 is 0.6.

If the next symbol is the third symbol, then the range coder divides the range from 0.48 to 0.54. For example, the first symbol is assigned the range of 0.48 to 0.516 because (0.54−0.48)*60% plus 0.48 is 0.516. The second symbol is assigned the range of 0.516 to 0.528 because (0.54−0.48) *20% plus 0.516 is 0.528. The third symbol is assigned the range of 0.528 to 0.534 because (0.54−0.48)*10% plus 0.528 is 0.534. The fourth symbol is assigned the range of 0.534 to 0.54 because (0.54−0.48)*10% plus 0.534 is 0.54.

The range coder may then proceed to the next symbol and again assign ranges to the symbols. The range coder may repeat these operations until end of payload, generating a long string of decimal point value that uniquely identifies the symbols that form the payload.

For decoding, the range coder performs a substantially reciprocal operation to reconstruct the symbols of the payload. For instance, the range coder receives a plurality of encoded bits that the range coder uses to determine a sub-portion within the range space. Based on the determined sub-portion within the range space, the range coder can reconstruct the original bit values of the data stream.

Accordingly, the range coder maintains a register referred to as "low" and a register referred to as "range." The low register stores the low value. For instance, in the above example, for the starting symbol, the low value is 0, and then for the next symbol, the low value is 0.48. The range register stores the range value. In some examples, the range value is the extent of the range from the low value, such that the range value plus the low value indicates the high value of the range. For instance, in the above example, for the starting symbol, the range value is 0.6 (e.g., 0.6−0 is 0.6), and then for the next symbol, the range value is 0.06 (e.g., 0.54−0.48 is 0.06). The range coder also stores a table of frequency (e.g., 60% for the first symbol, 20% for the second symbol, 10% for the third symbol, and 10% for the fourth symbol). In this disclosure, the low value and the range value are examples of state information that the range coder maintains for coding a symbol packet.

In the above example, the frequency table, also referred to as table of probability values, was preconstructed. However, in some applications, rather than pre-constructing the frequency table, the range coder may dynamically construct the frequency table. For instance, the range coder may initially assign each symbol the same size range, and the range coder updates the ranges based on how frequently the symbol is found in the payload. The table of probability values is another example of state information that the range coder maintains for coding a symbol packet.

The above example of range coding is a context-free range coding technique. For instance, the range value is based on the frequency of symbols in the payload, but not necessarily based on whether there is higher or lower probability of a grouping of particular symbols. In context-based range coding techniques, the range value is based not only on the frequency of symbols, but other factors, referred to as contexts, that indicate how likely a group of symbols may be.

As an example, assume that a symbol for the letter 'b' (symbol 'b') is 40% of the symbols, and a symbol for the letter 'r' (symbol 'r') is 5% of the symbols. In this example, assume that a starting symbol is the letter 'a.' In the English language, there are approximately 5594 words that start with 'ar' and approximately 2796 words that start with 'ab.' Therefore, although symbol 'b' occurs eight times more often than the symbol 'r', if a starting symbol is 'a', then there is actually a higher chance that the next letter will be 'r' instead of 'b.'

In context-based range coding, the range coder may account for the likelihood of which symbols follow which symbols to determine the range values. Accordingly, the same symbol may be associated with different ranges (also called probability values) based on the likelihood of that symbol following a previous symbol. The likelihood of a symbol following another symbol is one example of a context. There may be other types of contexts as well, such as types of symbols that were previously encoded or decoded, an offset value based on a dictionary (or history) position (described in more detail below), and the like.

In some examples, context-based range coding may be on a bit-by-bit basis for the bits that represent a symbol. For a given symbol represented by a plurality of bits, the range coder may encode or decode bit-by-bit based on the context values of the contexts associated to that bit. As one example, based on the context values of the contexts associated with a bit, the range coder may determine the probability value, and use the probability value to update the low and range values, and also update the probability value in some examples.

In context-based range coding, the range coder may retrieve the probability value from probability values stored as a multi-dimensional table in on-chip memory. The on-chip memory may be memory that is on the chip that includes the range coder, and may be shared by various components of the chip. In some examples, the probability values may be stored in on-chip memory of the chip that includes the range coder.

The range coder may determine an index into a table, possibly a multi-dimensional table, stored in the on-chip memory to determine a probability value for a coding a particular bit. The probability value may be indicative of the range for that bit. The range coder may determine the index into the table based on context values of different contexts such as a current offset relative to a dictionary (or history) position, a previous symbol, etc. As an example, the table may be a two-dimensional table, where a first dimension (e.g., vertical or horizontal in the two-dimensional table) corresponds to a first context (e.g., current state) and a second dimension (e.g., other one of the vertical or horizontal in the two-dimensional table) corresponds a second context (e.g., current offset).

The range coder reads the probability value and updates the range and low values in the range and low registers based on the read probability value. In some examples, the range coder may update the probability value because additional information is available indicating the likelihood of that symbol or group of symbols in the payload. For example, if the range coder is encoding or decoding a particular symbol, the range coder may update information indicating the frequency of the particular symbol, as well as the likelihood that the particular symbol follows another symbol. The range coder may write the updated probability value back into memory identified by the determined index. The range coder may perform such operations bit-by-bit.

For example, in Lempel-Ziv-Markov chain algorithm (LZMA), a range encoder compresses a data stream using context-based range encoding into a compressed stream of bits. The compressed stream of bits represents symbols, and each of the symbols is associated with values (e.g., original, uncompressed values of the data stream). For instance, each of the symbols represents a literal or a length-distance pair. The actual values represented by symbols (sometimes also called packets in this disclosure) are context-based range encoded based on values represented in previous symbols.

As an example, assume that a literal symbol follows a length-distance pair symbol. In some examples, the context value for encoding and decoding the literal is the previous byte and the match byte. The previous byte may be the actual value of the previous byte of the actual (e.g., uncompressed) values in the length-distance pair. The match byte may be the actual values of the byte that follows the location from where the values of the length-distance pair are retrieved.

The match byte and the previous byte are defined by LZMA, and their definitions are provided below.

As an example to assist with understanding match byte and previous byte, assume that the uncompressed, original data stream is as follows: mnopabcdxyzabcde. In this example, assume that each letter corresponds to one byte. In this data stream, there are two instances of "abcd." The first instance follows "p," and the second instance follows "z." Because there are two instances of "abcd," a search block may replace the second instance of "abcd" with a length-distance pair symbol. For example, the data stream may be as follows with the length-distance pair replacing the second instance of "abcd": mnopabcdxyz(D=7, L=4)e. In this example, D=7, L=4 is the length-distance pair symbol. For example, by going back seven letters (e.g., distance (D)=7), the data stream is at the start of the first instance of "abcd." The length (L) is 4, meaning that the next four letters are be inserted in place of (D=7, L=4) to reconstruct the data stream.

For example, a range decoder includes a memory (e.g., history buffer) that stores previously decoded values of symbols in the data stream. Accordingly, in this example, the memory stores mnopabcdxyz, when the range decoder arrives at the D=7, L=4 length-distance pair symbol. To reconstruct the data stream, the range decoder performs an expansion operation to insert the values represented by the length-distance pair symbol. For example, to perform the expansion operation, the range decoder accesses the memory at an offset of D=7 from current location in the memory and retrieves L=4 bytes from that location in memory. The range decoder inserts the retrieved bytes from the memory into the current location of the data stream.

Assume that the "e" following the second instance of "abcd" is a literal symbol. In the compressed data stream, the "e" would be represented by a plurality of context-based range encoded bits. Therefore, to decode the values of the literal symbol (e.g., to reconstruct the data stream to include "e"), the range decoder performs context-based range decoding. In some examples, two of the context values that the range decoder needs are previous byte and the match byte to determine the probability values needed to decode. In this example, the previous byte is "d" because it is the byte that immediately precedes "e." The match byte, in this example, is the byte in the data stream that immediately follows the location identified by the length and distance parameters of the preceding length-distance pair symbol. For example, the length-distance pair symbol preceding "e" is (D=7, L=4), which refers back to the first instance of "abcd." The byte that follows the first instance of "abcd" is "x." Accordingly, the range decoder determines that the match byte is "x." With the previous byte and the match byte, the range decoder determines the probability values used for decoding the literal symbol representing "e" and reconstructs the data stream to include "e."

In the above example, there may be potential technical problems that impact the rate at which the range decoder can reconstruct the data stream. For instance, to begin the process of decoding the values for "e," the range decoder may need to complete the expansion of length-distance pair symbol. For example, the range decoder may need to first expand the length-distance pair symbol and insert the values "abcd" into the data stream to determine that "d" is the previous byte. Accordingly, the starting of the decoding process of "e" is delayed until the length-distance pair symbol is expanded.

This disclosure describes example techniques in which context values represented by previous symbols are retrieved in parallel with (e.g., at the same time) or before the values represented by the previous symbols are inserted into the data stream. For example, although the values represented by the previous symbols have not been inserted into the data stream, the values represented by the previous symbols are already stored in the memory. As an example, the second instance of "d" is the previous byte needed for decoding "e," and may not be known until the values represented by the (D=7, L=4) length-distance pair symbol is expanded. However, the first instance of "d" is already stored in the memory.

For example, the memory of the range decoder stores mnopabcdxyz when the range decoder needs to expand the (D=7, L=4) length-distance pair symbol (e.g., insert "abcd" into the data stream). In one or more examples, rather than wait until the (D=7, L=4) length-distance pair symbol is expanded to retrieve "d" as the previous byte for decoding "e", the range decoder may be configured to determine that "d" from the first instance of "abcd" will be the previous byte for decoding "e" and retrieve "d" as the previous byte in parallel with or before the expansion of the length-distance pair symbol.

As described in more detail, the range decoder includes one or more pointer conversion circuits that are configured to determine one or more locations in the memory that store values represented by one or more previous symbols of the data stream prior to or in parallel with the values represented by the one or more previous symbols being inserted into the data stream. For example, a decoder circuit within the range decoder outputs a pointer value that identifies a location in the memory for where the values represented by the one or more previous symbols that are to be inserted into the data stream. The one or more pointer conversion circuitry may convert the pointer value to a converted pointer value that identifies locations in the memory for the values represented by the one or more previous symbols that are already stored in the memory.

For example, when decoding for the values of "e," the decoder circuit may generate a pointer value for where the previous byte is to be stored in the memory. In this example, the previous byte is the second instance of "d." For instance, after the (D=7, L=4) length-distance pair symbol is expanded with the second instance of "abcd" and each of a, b, c, and d are stored in respective locations in the memory. In this example, the decoder circuit may generate a pointer value that indicates where the second instance of "d" is to be located in the memory even if the (D=7, L=4) length-distance pair symbol is not yet expanded. This way, after the (D=7, L=4) length-distance pair symbol is expanded, the decoder circuit can retrieve the previous byte.

In accordance with one or more examples described in this disclosure, one or more pointer conversion circuits may receive the pointer value from the decoder circuit and convert the pointer value to point to a different location in the memory where the value is already located. For example, assume that the first instance of "d" is stored at a first location in the memory, and the second instance of "d" is to be stored at a second location in the memory. The decoder circuit may output a pointer value that identifies the second location in the memory since the second instance of "d" is the previous byte for decoding "e" in the "mnopabcdxyzabcde" data stream. The one or more pointer conversion circuits may be configured to convert the pointer value that identifies the second location in the memory to a converted pointer value that identifies the first location in the memory (e.g., where the first instance of "d" is stored). This allows the decoder circuit to retrieve the previous byte (e.g., "d"), which is a context value for decoding "e", before or in parallel with the range decoder expanding the (D=7, L=4) length-distance pair symbol by inserting "abcd" into the data stream.

The manner in which the one or more pointer conversion circuits determine how to convert the pointer value is described in more detail below. Also, the above example techniques are described with respect to the previous byte. The example techniques may be extended for other context values, such as match byte, as described in more detail.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the example data center network architecture and interconnected access nodes illustrated in FIG. 1 are available in U.S. Patent Publication No. 2018/0287965, entitled "Non-Blocking Any-to-Any Data Center Network with Packet Spraying Over Multiple Alternate Data Paths," the entire content of which is incorporated herein by reference.

Various example architectures of access nodes 17 are described below with respect to FIGS. 2, 3, and 4. With respect to the examples, the architecture of each access node 17 comprises a multiple core processor system that represents a high performance, hyper-converged network, storage, and data processor and input/output hub. The architecture of each access node 17 is optimized for high performance and high efficiency stream processing. For example, by retrieving values represented by one or more previous symbols, where the values are context values needed for decoding a current symbol (e.g., determining values represented by the current symbol), before or in parallel with the values represented by one or more previous symbols being inserted into the data stream, the example techniques allow for faster decoding by reducing latency.

In general, a stream, also referred to as a data stream, may be viewed as an ordered, unidirectional sequence of computational objects that can be of unbounded or undetermined length. In a simple example, a data stream originates in a producer and terminates at a consumer, is operated on sequentially, and is flow-controlled. In some examples, a data stream can be defined as a sequence of stream fragments, each representing a portion of data communicated by a data stream. In one example, a stream fragment may include a memory block contiguously addressable in physical address space, an offset into that block, and a valid length. Data streams can be discrete, such as a sequence of packets received from a network, or continuous, such as a stream of blocks, words or bytes read from a storage device. A data stream of one type may be transformed into another type as a result of processing. Independent of the data stream type, data stream manipulation requires efficient fragment manipulation. An application executing on one of access nodes 17 may operate on a data stream in three example broad ways: the first is protocol processing, which includes operating on control information or headers within the stream; the second is payload processing, which involves significant accessing of the data within the stream; and third is some combination of both control and data access.

Data stream processing is a specialized type of conventional general-purpose processing supporting specialized limitations with regard to both access and directionality. Processing typically only accesses a limited portion of the stream at any time, called a "window," within which it may perform random accesses. Objects outside of the window are not accessible through a streaming interface. In contrast, general purpose processing views the whole memory as randomly accessible at any time. In addition, data stream processing generally progresses in one direction, called the forward direction. These characteristics make data stream processing amenable to pipelining, as different processors within one of access nodes 17 can safely access different windows within the stream.

As described herein, data processing units of access nodes 17 may process data stream information by managing "work units." In general, a work unit (WU) is a container that is associated with a stream state and used to describe (i.e. point to) data within a stream (stored in memory) along with any associated meta-data and operations to be performed on the data. In the example of FIG. 1, data streams of data units may dynamically originate within a peripheral unit of one of access nodes 17 (e.g. injected by a networking unit, a host unit, or a solid state drive interface), or within a processor of the one of access nodes 17, in association with one or more data streams of data, and terminate at another peripheral unit or another processor of the one of access nodes 17. Each work unit maintained by a data processing unit is associated with an amount of work that is relevant to the entity executing the work unit for processing a respective portion of a data stream.

Data stream processing is typically initiated as a result of receiving one or more data units associated with respective portions of the data stream and constructing and managing work units for processing respective portions of the data stream. In protocol processing, a portion would be a single buffer (e.g. packet), for example. Within access nodes 17, work units may be executed by processor cores, hardware blocks, I/O interfaces, or other computational processing units. For instance, a processor core of an access node 17 executes a work unit by accessing the respective portion of the data stream from memory and performing one or more computations in accordance with the work unit. A component of the one of access nodes 17 may receive, execute or generate work units. A succession of work units may define how the access node processes a flow, and smaller flows may be stitched together to form larger flows.

As described above, the range coder encodes or decodes symbols, and these symbols may be generated by execution of an application. In some examples, the range coder receives a data stream of packets, containing symbols, from execution of one application. However, this may not always be the case. In various examples, the range coder receives a first data stream of one or more packets, containing symbols, from execution of a first application, and, in parallel, receives a second data stream of one or more packets, containing symbols, from execution of a second application. In such cases, the range coder may dynamically switch its coding operations between the first and second data streams. For instance, the range coder may code packets from the first data stream, and then switch to coding packets from the second data stream, and then return back to coding packets from the first data stream, and so forth. Accordingly, rather than sequentially processing to completion each data stream, which can delay the amount of time before a data stream is processed, the range coder switches between data streams to provide a piecemeal coding process.

In general, there may be various reasons to switch processing. As one example, the data to process for a particular data stream has not arrived yet from source, therefore, it may be beneficial to switch to processing another data stream, rather than pausing and waiting for data for the data stream that was being processed. As another example, one data stream may be taking over full bandwidth, and not allowing the process of any other data stream. By switching, each stream is given a time quantum.

For purposes of example, DPUs of or within each access node 17 may execute an operating system, such as a general-purpose operating system or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. The level 1 cache is one example of on-chip memory. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. patent application Ser. No. 16/197,179, filed Nov. 20, 2018, entitled "Work Unit Stack Data Structures in Multiple Core Processor System," and published as U.S. Publication No. 2019/0158428 and U.S. patent application Ser. No. 15/949,692, entitled "EFFICIENT WORK UNIT PROCESSING IN A MULTICORE SYSTEM", filed Apr. 10, 2018, issued as U.S. Pat. No. 10,540,288 the entire contents of both being incorporated herein by reference.

As described herein, the data processing units for access nodes 17 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data storage functions and networking operations.

A data compression/decompression accelerator unit of a data processing unit may include a hardware pipeline for performing history/dictionary-based compression. The disclosed history/dictionary-based compression hardware pipeline, referred to herein as a "search block," is configured to perform string search and replacement functions to compress an input data file. In some examples, the search block performs a first stage of a two-stage compression process performed by the data compression/decompression accelerator unit. The second stage of the compression/decompression process includes entropy coding, which may be performed using either a prefix-free, variable length coding block, such as a Huffman coding block, or a Range coding block. For decompression, a first stage of a two-stage decompression process performed by the data compression/decompression accelerator unit includes entropy decoding or Range decoding, and a second stage includes history/dictionary-based decompression. One or more examples are described with respect to the compression/decompression process of the data compression/decompression accelerator unit, such as range encoding and decoding performed by a range coder circuit of the data compression/decompression accelerator unit.

Part of the first stage of the two-stage compression process includes determining literals, and length-distance pairs in an input data file. Literals directly represent the original data (i.e., string of bytes), and the length-distance pairs are pointers to previous occurrences of a string of bytes within a sliding history window. The length-distance pairs may include a length parameter and a distance parameter. The second stage of the two-stage compression includes converting the literal, length, and distance parameters into codewords, such as via entropy encoding techniques.

As described above, for range coding, a range coder determines range and low values for each bit of a plurality of bits used to represent a symbol. The range value may be based on a probability value stored in a table of probability values. To determine the probability value, the range coder determines context values for a plurality of contexts, and based on the context values, the range coder is able to identify the probability value.

In accordance with one or more examples described in this disclosure, the symbols (e.g., length-distance pairs or literals) represent particular values. For example, a length-distance pair symbol represents a set of bytes located earlier in the data stream, where the location in the data stream is identified by the distance parameter and the run of bytes starting from the location identified by the distance parameter is the length parameter. In this example, the length-distance pair symbol represents the values of the set of bytes identified by the length and distance parameters. A literal symbol may represent the actual literal values, and therefore, the values represented by the literal symbol may be the actual values of the literal symbol.

For decoding, as described above, a first stage of the two-stage decompression process includes context-based decoding and the second stage include history/dictionary based decompression. For instance, for a length-distance pair symbol, the length and distance parameters may be context-based encoded and, in the first stage, a decoder circuit performs the context-based decoding to determine the length parameter and the distance parameter. Then, in the second stage, an expander circuit uses the length and distance parameters to access particular locations in the memory, retrieve values stored in the accessed memory locations, and insert the values into the data stream. The values may also be re-stored back in memory for later retrieval. For a literal symbol, the values of the literal may be context-based encoded and, in the first stage, the decoder circuit performs the context-based decoding to determine the values of the literal symbol. The values of the literal symbol may be stored in memory for later retrieval but any expansion may not be needed for the literal symbol because the values represented by the literal symbol after the context-decoding are the final values, unlike for a length-distance pair where the actual values are retrieved and inserted into the data stream.

In some examples, such as for literal symbols, to perform the first stage (e.g., context-based decoding), the context values are based on values represented by one or more previous symbols. As one example, the previous byte used to context-based decode a literal symbol is the previous byte in the data stream. In some cases, if the values represented by the one or more previous symbols are not included in the data stream (e.g., the one or more previous symbols have not yet been expanded with the actual values), then there may be a delay in determining the context values for the literal symbol. For example, if the previous symbol is a length-distance pair symbol, and the actual values for the length-distance pair symbol are not yet determined (e.g., the length-distance pair symbol has not yet been expanded), then there may be delay in determining the context values for decoding the literal symbol.

In one or more example techniques described in this disclosure, a decoder circuit configured to perform the context-based decoding (e.g., first stage) may output a pointer value that indicates where in memory the value represented by one or more previous symbols is to be stored (e.g., after expansion of the one or more previous symbols). For example, the memory may be a ring buffer or a first-in-first-out (FIFO) buffer with a fixed size. Based on the size of ring buffer or FIFO buffer, the decoder circuit may be configured to determine where the values represented by one or more previous symbols (e.g., previous byte used as a context value for decoding a current symbol) are to be stored even if the values have yet to be stored.

A pointer conversion circuit may be configured to determine where in the memory the values represented by the one or more previous symbols are already stored. For example, if the one or more previous symbols are a length-distance pair symbol, the pointer conversion circuit may determine where in the memory the values that are represented by the length-distance pair symbol are already stored before or in parallel with the insertion of the values represented by the length-distance pair symbol in the data stream (e.g., before expansion of the length-distance pair symbol). The pointer conversion circuit may convert the pointer value outputted by the decoder circuit into a converted pointer value that identifies the location in the memory that already contains the values represented by the one or more previous symbols. The decoder circuit receives the values from the memory identified by the converted pointer value, and can being the process of decoding the current symbol (e.g., determining the context values needed to determine the probability value for decoding the current symbol) without needing the expansion of the one or more previous symbols to be complete.

Figure 2:
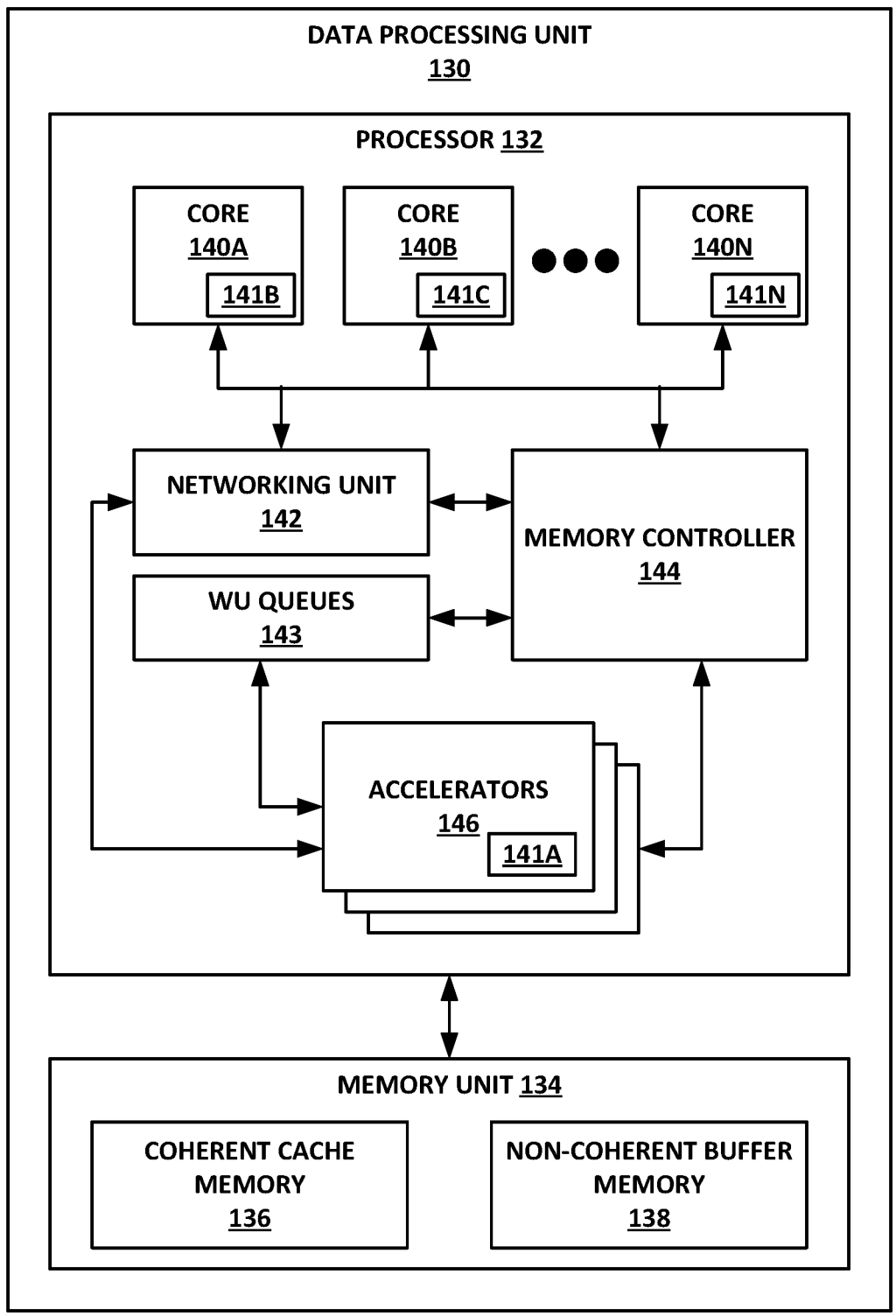
FIG. 2 is a block diagram illustrating an example data processing unit including two or more processing cores, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 17 of FIG. 1. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141*a*, 141*b*, and 141*n* are associated with cores 140*a*, 140*b*, and 140*n*, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 2, each of cores 140, networking unit 142, WU queues 143, memory controller 144, memory unit 134, and accelerators 146 are communicatively coupled to each other. In some examples, processor 132 of DPU 130 further includes one or more accelerators (not shown) configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 146 configured to perform acceleration for various data-processing functions, such as look-ups, matrix multiplication, cryptography, compression, regular expressions, or the like. For example, accelerators 146 may comprise hardware implementations of look-up engines, matrix multipliers, cryptographic engines, compression engines, or the like. In accordance with the techniques of this disclosure, at least one of accelerators 146 represents a hardware implementation of a data decompression engine. For example, at least one of accelerators 146 includes a decoder circuit to perform the context-based decoding (e.g., first stage of decompression), a memory manager circuit, and an expander circuit to include values represented by the symbols into the data stream (e.g., second stage of decompression). At least one of accelerators 146 may also include one or more pointer conversion circuits that are configured to convert a pointer value that identifies a first location in the memory to a converted pointer value that identifies a second location in the memory where the values are already stored. This way the decoder circuit can retrieve context values needed for decoding the current symbol from the second location before those values are stored or in parallel with the storing of the values in the first location.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management. For example, memory controller 144 may be capable of mapping accesses from one of the cores 140 to either of coherent cache memory 136 or non-coherent buffer memory 138. More details on the bifurcated memory system included in the DPU are available in U.S. Patent Publication No. 2018/0293168 and titled "Relay Consistent Memory Management in a Multiple Processor System," issued as U.S. Pat. No. 10,565,112, the entire content of each of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130. The load/store unit may also include logic for flushing cache segments and/or cache lines to non-coherent buffer memory 138 and/or memory external to DPU 130. In some examples, the load/store unit may be configured to prefetch data from main memory during or after a cache segment or cache line is flushed.

Processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
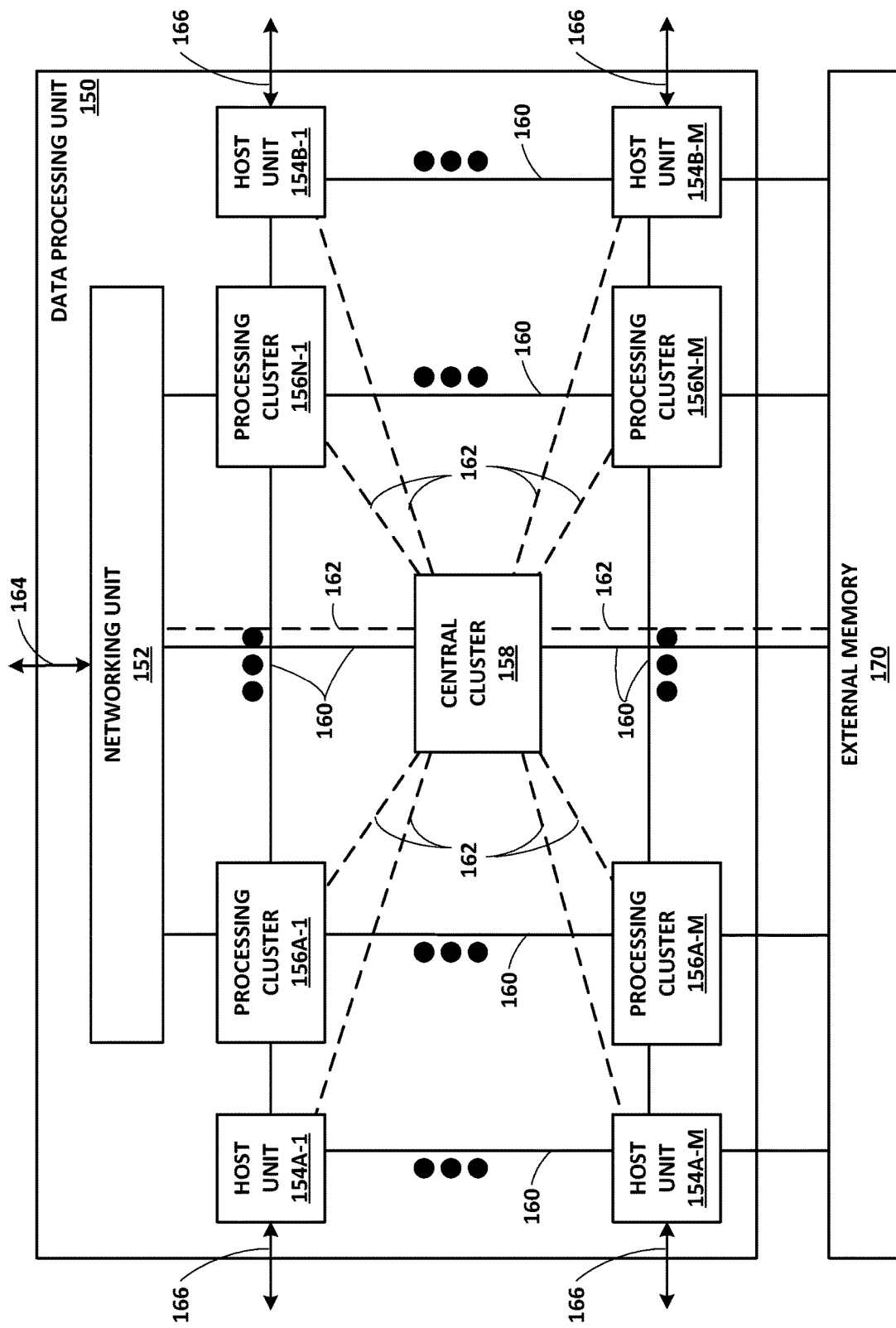
FIG. 3 is a block diagram illustrating another example data processing unit including two or more processing clusters, in accordance with the techniques of this disclosure.

FIG. 3 is a block diagram illustrating another example of a DPU 150 including two or more processing clusters, in accordance with the techniques of this disclosure. DPU 150 may operate substantially similar to any of the access nodes 17 of FIG. 1. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. patent application Ser. No. 16/197,179, filed Nov. 20, 2018, published as U.S. Publication No. 2019/0158428, the entire content of which is incorporated herein by reference.

In some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

DPU 150 may include one or more accelerators for performing range encoding/decoding of a data stream received and stored in memory of DPU 150. As described in more detail, the accelerators of DPU 150 include a range coder configured to perform range encoding/decoding techniques. As described above, in range coding, the range coder may determine a range value. The range value is based on how often (e.g., probability) certain bit combinations occur in the data stream. In some examples, various contexts may be indicative of the probability of a particular bit combination.

Context based coding utilizes contexts to determine the probability values for range encoding or decoding bits used to represent a symbol. For example, a context, such as previously coded values, can be indicative of the likelihood of a next bit being a one or zero. It should be understood that the contexts may indicate a likelihood of a particular bit being a one or zero, but the actual bit value may be different. However, on average, using information indicative of the likelihood of a bit being a particular value can reduce the amount of bits in a data stream.

Figure 4:
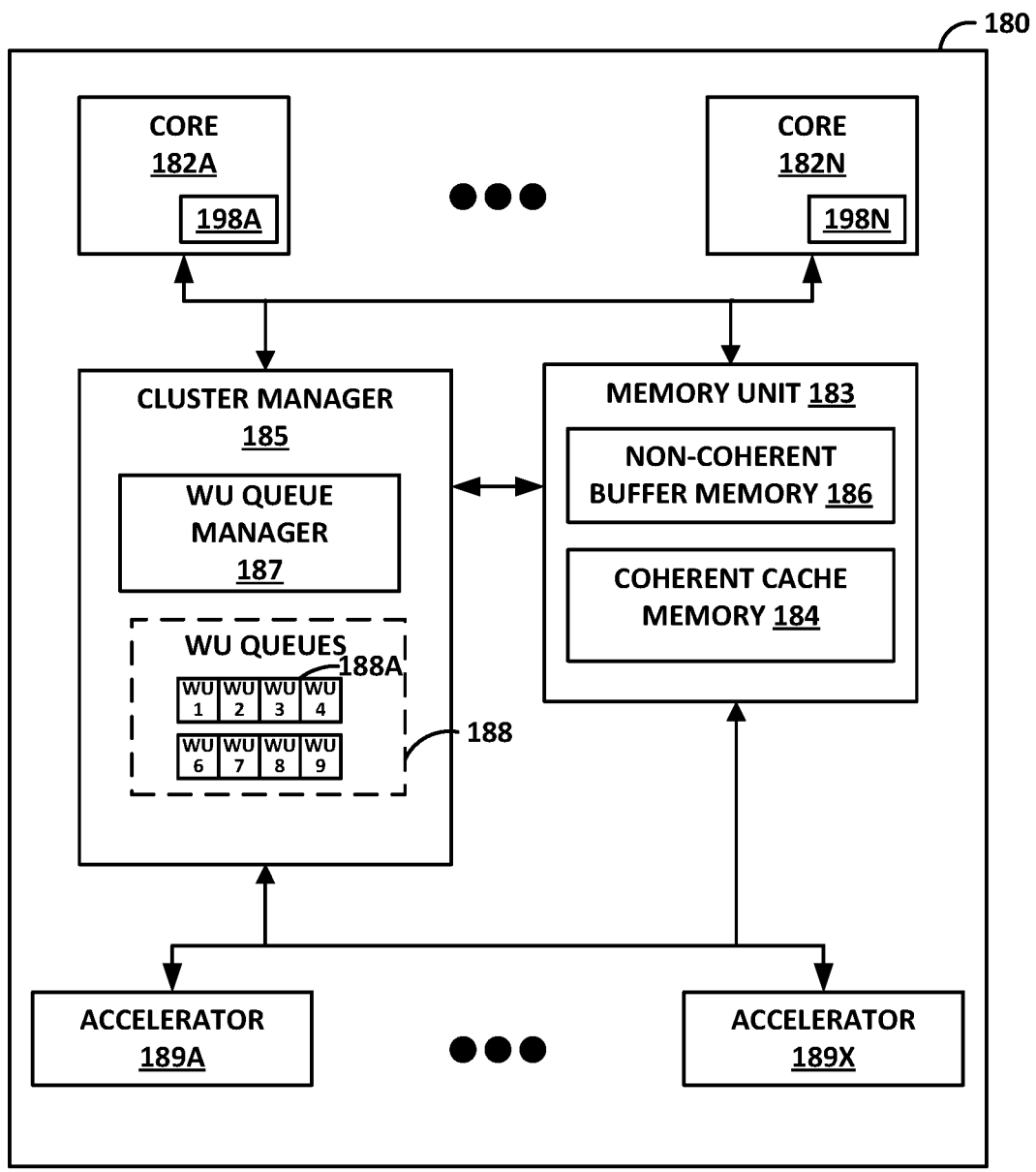
FIG. 4 is a block diagram illustrating an example processing cluster including two or more processing cores.

FIG. 4 is a block diagram illustrating an example processing cluster 180 including two or more processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). Although not shown, accelerators 189 may also include L1 buffer caches. In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression/decompression, regular expressions, or the like. That is, accelerators 189 may comprise hardware implementations of lookup engines, matrix multipliers, cryptographic engines, compression/decompression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression/decompression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to perform range coding. For example, one or more of accelerators 189 include a decoder circuit to perform the context-based decoding (e.g., first stage of decompression), a memory manager circuit, and an expander circuit to include values represented by the symbols into the data stream (e.g., second stage of decompression). One or more of accelerators 189 may also include one or more pointer conversion circuits that are configured to convert a pointer value that identifies a first location in the memory to a converted pointer value that identifies a second location in the memory where the values are already stored. This way the decoder circuit can retrieve context values needed for decoding the current symbol from the second location before those values are stored or in parallel with the storing of the values in the first location.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 156A and/or external memory 170. Core 182A may first look for the corresponding data in cache 198A, and in the event of a cache miss, may access the data from non-coherent memory 156A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

In some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 5:
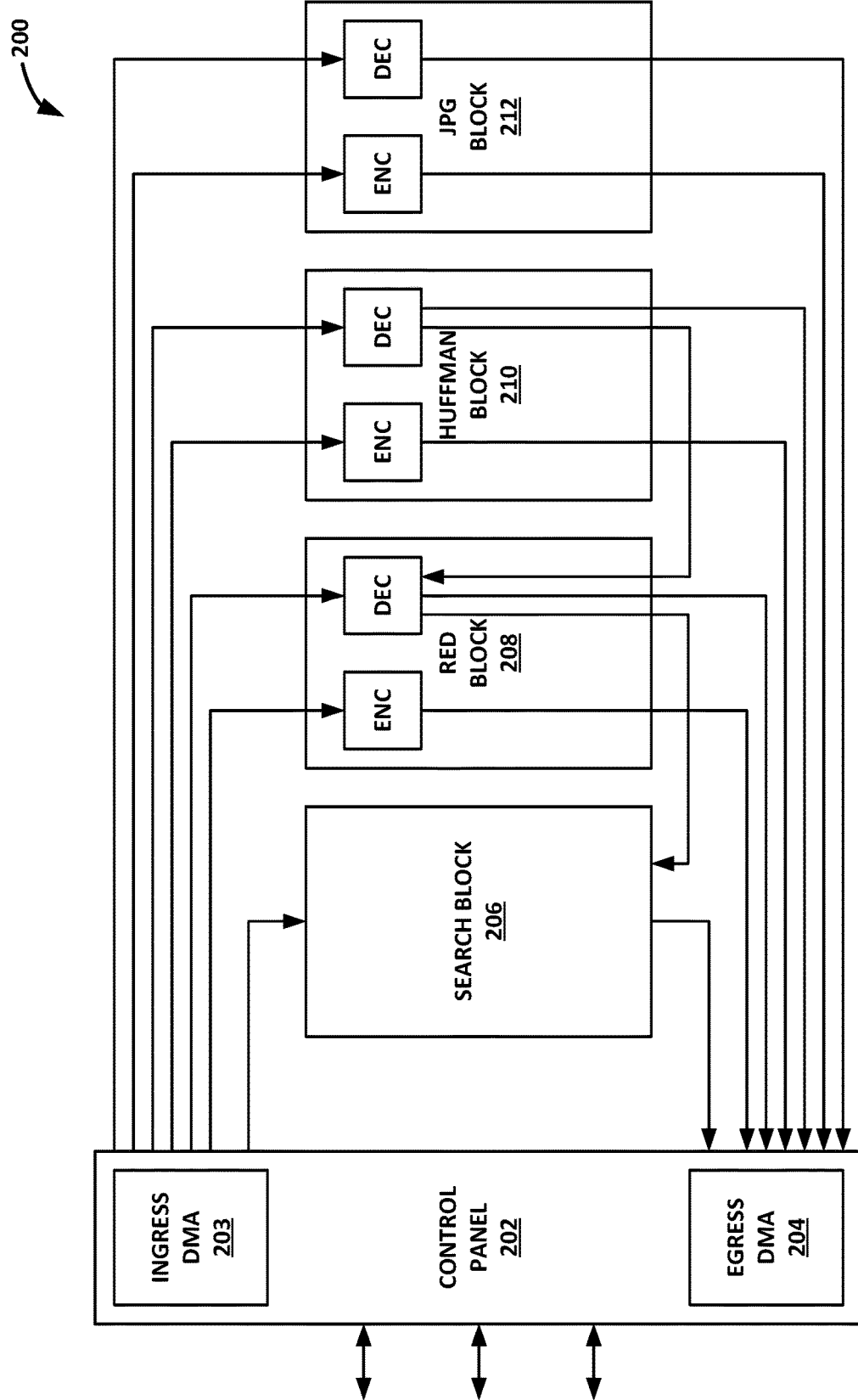
FIG. 5 is a block diagram illustrating an example data compression/decompression accelerator.

FIG. 5 is a block diagram illustrating an example data compression/decompression accelerator 200. For example, data compression/decompression accelerator 200 may be one or more of accelerators 146 of data processing unit 130 from FIG. 2, or one or more of accelerators 189 of processing cluster 180 from FIG. 4. In some examples, data compression/decompression accelerator 200 may be included in each of processing clusters 156 of data processing unit 150 from FIG. 3.

Data compression/decompression accelerator 200 is configured to accelerate the computationally intensive data compression and decompression operations conventionally performed by software running on a general purpose processor. As illustrated in FIG. 5, data compression/decompression accelerator 200 includes a control panel 202, a search block 206, a range encode/decode (RED) block 208, a Huffman encode/decode block 210, and a JPG re-encode/decode block 212. RED block 208 is an example of the range coder described above.

With these components, as described in more detail below, data compression/decompression accelerator 200 may support DEFLATE compression and decompression used by gzip and zlib, support Lempel-Ziv-Markov chain algorithm (LZMA) compression and decompression, and support JPG re-compression and decompression. DEFLATE compression comprises a lossless data compression algorithm that uses a combination of a dictionary-based compression scheme performed by search block 206 and Huffman encoding performed by Huffman block 210. For example, the dictionary-based compression scheme may comprise one of the LZ77, LZ78, LZW, LZ4, LZO, or LZS algorithms. The DEFLATE compression and decompression is described in more detail in P. Deutsch, "DEFLATE Compressed Data Format Specification version 1.3," IETF Network Working Group, RFC 1951, May 1996. LZMA compression comprises another lossless data compression algorithm that uses a combination of a dictionary-based compression scheme performed by search block 206 and range encoding performed by RED block 208. JPG re-compression comprises lossy compression for digital images performed by JPG block 212.

Control panel (CP) 202 of data compression/decompression accelerator 200 operates as an interface to the other blocks in data compression/decompression accelerator 200, and is the only block in data compression/decompression accelerator 200 with external interfaces. CP 202 controls the mode of operation, manages WUs, and tracks resources and schedules jobs to the engine blocks (i.e., search block 206, RED block 208, Huffman block 210, and JPG block 212) within data compression/decompression accelerator 200. CP 202 also provides ingress DMA 203 and egress DMA 204. The engine blocks within data compression/decompression accelerator 200 work on a stream of data and there are no random accesses to external memories or to external blocks. External interfaces of CP 202 are used for receiving WUs, sending WUs, receiving payload data, sending result data, and receiving configuration data. Internal interfaces between the engine blocks within data compression/decompression accelerator 200 are mostly streaming interfaces. The internal interfaces may use credit-based flow control. For example, at the beginning of a job there may be N flow control units ('flits') of header data that describe the job.

CP 202 is responsible for controlling access to shared resources that can be used by multiple of the engine blocks within data compression/decompression accelerator 200. Any scheduling of resources local to a specific one of the engine blocks may be done locally by that engine block. For example, search block 206 and RED block 208 may share a history buffer local to search block 206. As another example, RED block 208 and Huffman block 210 may share one or more history buffers local to RED block 208. Certain WUs may depend on one or more of the shared resources. As such, CP 202 may control the resource assignment and only schedule WUs that do not conflict with the current resource assignment. The engine blocks within data compression/decompression accelerator 200 may not be able to detect or resolve shared resource conflicts themselves. In addition, several of the engine blocks within data compression/decompression accelerator 200, e.g., search block 206, RED block 208, and Huffman block 210, may have multiple threads. Some of the engine blocks, e.g., at least search block 206, may have both a single thread mode and a multi thread mode, depending on the type of job being processed.

Search block 206 may be the first stage of a two-stage compression process performed by data compression/decompression accelerator 200. For example, search block 206 may be configured to perform a dictionary-based compression algorithm (e.g., the LZ77 algorithm or variants thereof) to search for and replace repeated occurrences of strings of bytes in an input data file. Search block 206 uses a local a history buffer that includes previously seen data as the dictionary for the compression algorithm. Search block 206 is configured to scan the input data file for repeated strings within a history window, and replace the repeated strings with length-distance pairs that point to previous occurrences of the strings. The output of search block 206 includes one or both of literals (i.e., strings of bytes) and length-distance pairs used to replace repeated strings of bytes. The output of search block 206 may then go through a second stage of compression using entropy encoding, either using Huffman encoding performed by Huffman block 210 or range encoding performed by RED block 208.

The dictionary-based decompression operation involves expanding the length-distance pairs into strings of bytes based on a history buffer. For example, the dictionary-based decompression operation may be performed by RED block 208 since the latency of the decompression operation affects the throughput of search block 206. In the case where the history buffer for the dictionary-based decompression operation is small (e.g., less than or equal to 32 KB), RED block 208 may use a history buffer that is local to RED block 208. In the case where the history buffer for the dictionary-based decompression operation is large (e.g., greater than 32 KB), RED block 208 may use its local buffer as a cache and use the history buffer at search block 206 for up to the maximum supported history buffer size, e.g., 256 KB. When RED block 208 uses the history buffer at search block 206, search block 206 may be disabled. Therefore, the dictionary-based encode/decode operation using a small history buffer may be full duplex, and the dictionary-based encode/decode operation using a large history buffer is half duplex.

Following the dictionary-based compression (e.g., the LZ77 algorithm) performed by search block 206, the encode (ENC) portion of Huffman block 210 may perform the second stage of the two-stage compression process for DEFLATE compression used by gzip and zlib. The output of search block 206 is the input to the encode portion of Huffman block 210. The encode portion of Huffman block 210 performs Huffman encoding, which is a type of entropy encoding that replaces high frequency symbols with shorter codewords and low frequency symbols with longer codewords. As a first step, encoder circuit 214 of Huffman block 210 gathers a frequency histogram for every symbol in a block of data, and stores the data in a buffer as the statistics are counted. As a second step, Huffman block 210 assigns codewords based on the frequency of each symbol. In parallel with this step, the next block of data arrives in a second buffer. As a third step, Huffman block 210 outputs the encoding table (e.g., codeword table), which also gets compressed. As a fourth step, Huffman block 210 outputs the encoded data. As the buffer is being drained, the next block begins filling the buffer. There are two buffers per thread. In some examples, Huffman block 210 has two threads such that there are a total of four buffers.

The decode (DEC) portion of Huffman block 210 may perform a first stage of a decompression process for DEFLATE format compressed data used by gzip and zlib. Huffman block 210 decodes a binary data stream of encoded symbols, represented as codewords, and replaces them with the original symbols. The encoded symbols (e.g., the codewords) are of variable length, so the length of the previous codeword determines where the next codeword to be decoded begins in the data stream. This chain of dependencies typically makes fast decoding challenging. The output of a decoder circuit of Huffman block 210 is a sequence of literals and/or length-distance pair symbols. The literals directly represent the original data (i.e., strings of bytes), and the length-distance pairs are pointers to previous occurrences of a string of bytes within a sliding history window. The second stage of the decompression process for DEFLATE is to expand the length-distance pairs. For DEFLATE, the symbol decode and the expansion are independent operations and, therefore, the operations may be performed by separate engine blocks.

In some cases, LZMA specification does not support static dictionary. RED block 208 may be configured to extend LZMA to support the static dictionary as '(dynamic dictionary+word offset)'.

RED block 208 performs range encoding and range decoding. The range encode (ENC) portion of RED block 208 is a data stream encoder that compresses one bit at a time. The range encoding algorithm is comparable to arithmetic encoding. The range encode portion of RED block 208 uses a context memory that provides a probability of a 1 or 0 based the current context. The context memory is updated on the fly during compression and that process is precisely mirrored during decompression. In general, range encoding provides higher compression than Huffman encoding at the cost of lower throughput, larger area, and higher complexity. An example of range encoding is described with respect to FIG. 8.

In general, during range encoding, the encode portion of RED block 208 reads probability values to determine how to apportion a range space into sub-portions, and determines the sub-portion to which a symbol belongs. The sub-portion to which the symbol belongs can be represented as a range value and a low value, which are decimal values (e.g., values between 0 and 1), as one non-limiting example. The encode portion of RED block 208 may determine a plurality of bits having a decimal value that is within the sub-portion (e.g., greater than the low value, and less than the low value plus the range value). The resulting plurality of bits are the encoded version of the symbol.

In some examples, it may not be possible to wait until all symbols are encoded and then pick a number between 'low' and 'range' to represent the encoded symbol sequence, due to the limitation on number of bits needed to represent 'low' and 'range.' Accordingly, the range encoder may start outputting bits as and when the values cross number of bits to hold 'low' and 'range' values (e.g., 32 or 64 bits). For example, if the low or range value gets bigger than 32 or 64 bits, the range coder may output the low or range value so as to not overflow.

In one or more examples, the encode portion of RED block 208 determines probability values, used to apportion the range space into sub-portions, based on context values of one or more contexts. Contexts, as described above, are information derived from characteristics of previously encoded data (e.g., bit value of a previous bit, position of a previous bit, classification of previously encoded data, etc.). A context value is a value used to indicate a value of the context.

Following the dictionary-based compression (e.g., the LZ77 algorithm) performed by search block 206, the encode portion of RED block 208 may perform the second stage of the two-stage compression process for LZMA compression. Data compression/decompression accelerator 200 may have two modes of operation for LZMA compression. In a streaming mode, the output of search block 206 is directly sent to RED block 208 using one WU. In some cases, however, there may be a speed mismatch where search block 206 is running faster than RED block 208. To optimize this case, a second mode of operation decouples the search stage from the RED stage using a separate WU for each stage. In the second mode of operation, the intermediate results are directly stored to and accessed from on-chip memory via ingress DMA 203 and egress DMA 204. In the second mode of operation, RED block 208 may use multiple encoding threads to better match the throughput of search block 206.

In some examples, it may be possible for the ENC portion of RED block 208 to not produce any output for many symbols, and then output a burst of bytes. To handle this, in some examples, the buffer to which END portion of RED block 208 outputs includes a margin from the end of the buffer used to detect the overflow and stop the operation without actually overflowing the output buffer in most cases.

The decode (DEC) portion of RED block 208 may perform a first stage of a decompression process for LZMA format compressed data. The decode portion of RED block 208 receives the data to be decoded from ingress DMA 203 and sends the results out over egress DMA 204. Depending on the size of the history buffer used during LZMA compression, RED block 208 may use small internal history buffers, which allows for full duplex encode/decode, or RED block 208 may use a large external history buffer from search block 206, which only allows for half duplex encode/decode. Search block 206 may be disabled when RED block 208 is decoding using the large external history buffer local to search block 206.

In some examples, DEC portion of RED block 208 may store already decoded symbols into context. To avoid such a case, there may be a margin in the buffer to which the DEC portion of RED block 208 outputs with a minimum length equal to the maximum supported length (e.g., 273, which is the maximum length supported in LZMA).

Similar to Huffman decoding for DEFLATE, range decoding for LZMA decompression involves decoding symbols and expanding symbols that reference a history buffer. Unlike Huffman decoding, the expansion of the symbols in range decoding may affect the context used to decode the next symbol. In addition to perform range decoding for LZMA decompression, the decode portion of RED block 208 also performs the second stage of Huffman decoding for DEFLATE, i.e., the length-distance pair expansion. In this case, the decode portion of RED block 208 receives the input from Huffman block 210, and generates the final result that is sent out over egress DMA 204.

In one or more examples, RED block 208 is configured to perform example techniques described in this disclosure. For instance, RED block 208 includes a decoder circuit to perform context-based decoding including outputting a pointer value used to access the history buffer (e.g., memory) to retrieve context values. In some examples, the values in the history buffer that the decoder circuit is to retrieve may not yet be populated in the history buffer (e.g., memory). For example, the location of the history buffer identified by the pointer value may be a location that stores values represented by one or more previous symbols after RED block 208 expands the one or more previous symbols. Therefore, until RED block 208 performs the expansion operation, the values may not be available in the location identified by the pointer value. Accordingly, there may be a delay in beginning the decoding of a current symbol until after the expansion of the one or more previous symbols.

Figure 9:
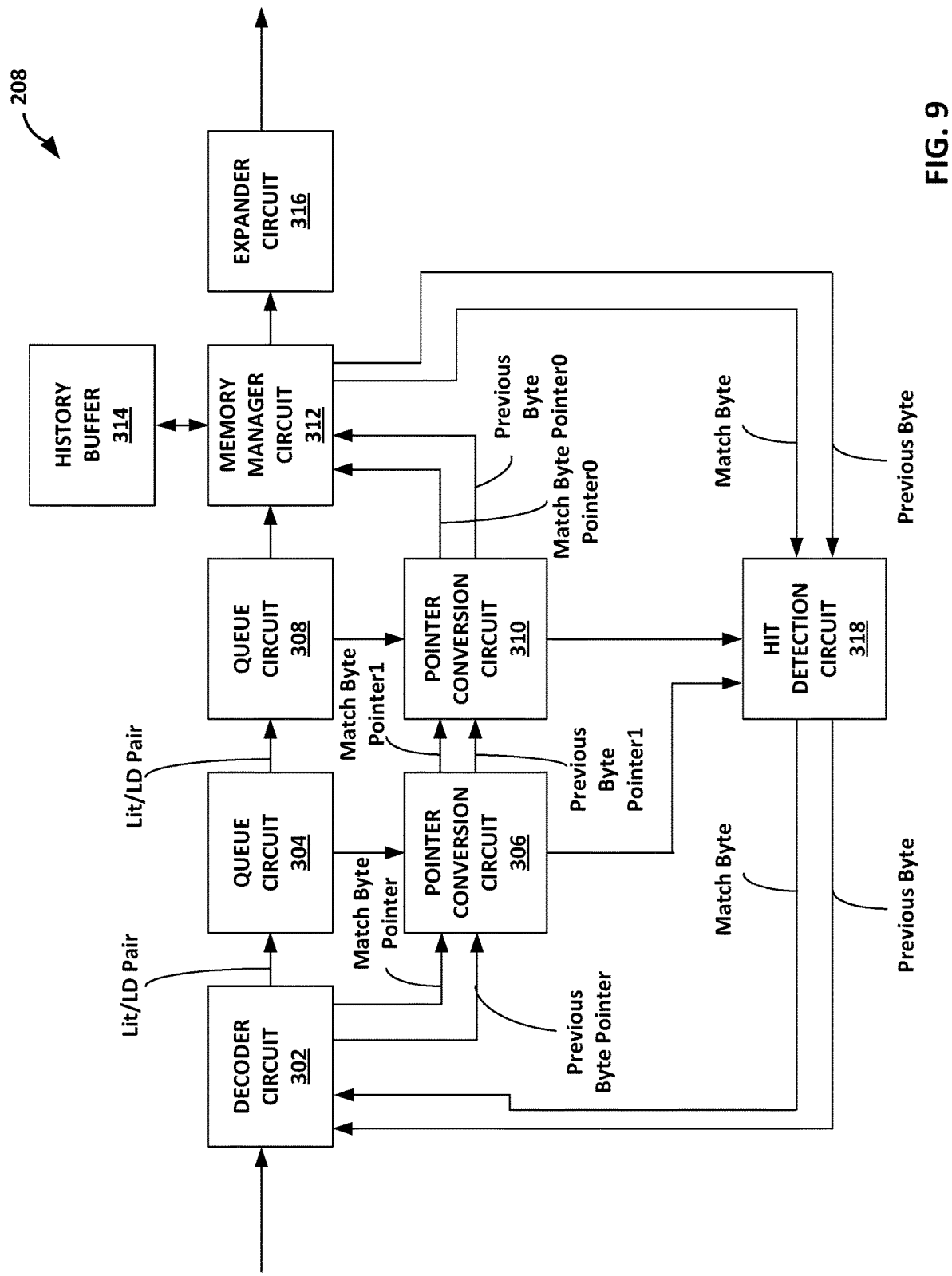
FIG. 9 is a block diagram illustrating an example of a range decoder.

In accordance with one or more examples described in this disclosure, there may be a possibility that the values that are needed for decoding the current symbol are already stored in the history buffer at a location other than the location identified by the pointer value. One or more pointer conversion circuits may convert the pointer value to a converted pointer value that identifies the other location in the history buffer where the values needed for decoding the current symbol are already stored. The decoder circuit may be able to access the values from this other location in parallel with or before expansion of the one or more previous symbols. An example of RED block 208 is illustrated in FIG. 9.

JPG block 212 may losslessly re-encode jpg files into a proprietary format. Standard jpg files may be compressed in two phases, first a lossy phase and then second a lossless phase using Huffman encoding. JPG block 212 is configured to replace the lossless phase with a more advanced compression algorithm. Similar to RED block 208, JPG block 212 uses an adaptive context-based bit-wise encoder, but it has been specifically optimized for image data. JPG block 212 performs compression and decompression of image data independently from the other engine blocks within data compression/decompression accelerator 200 and is only in communication with CP 202.

Figure 6B:
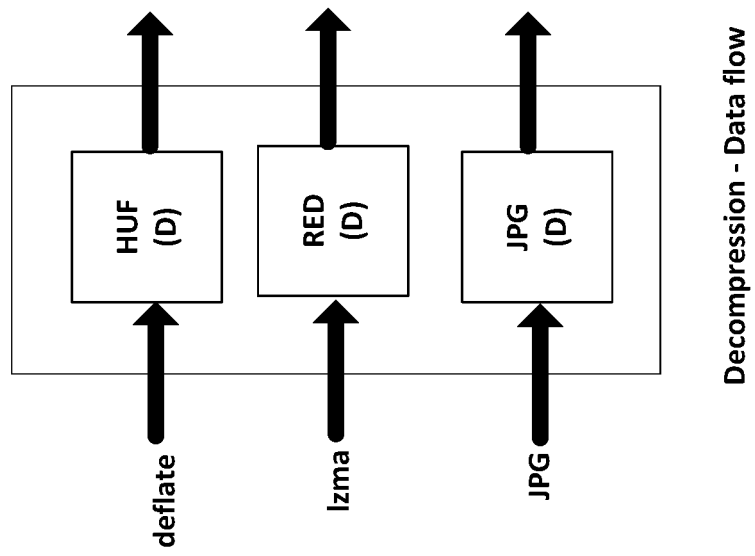
FIGS. 6A and 6B are conceptual diagrams illustrating example data flows through engine blocks within a data compression/decompression accelerator of FIG. 5.
Figure 6A:
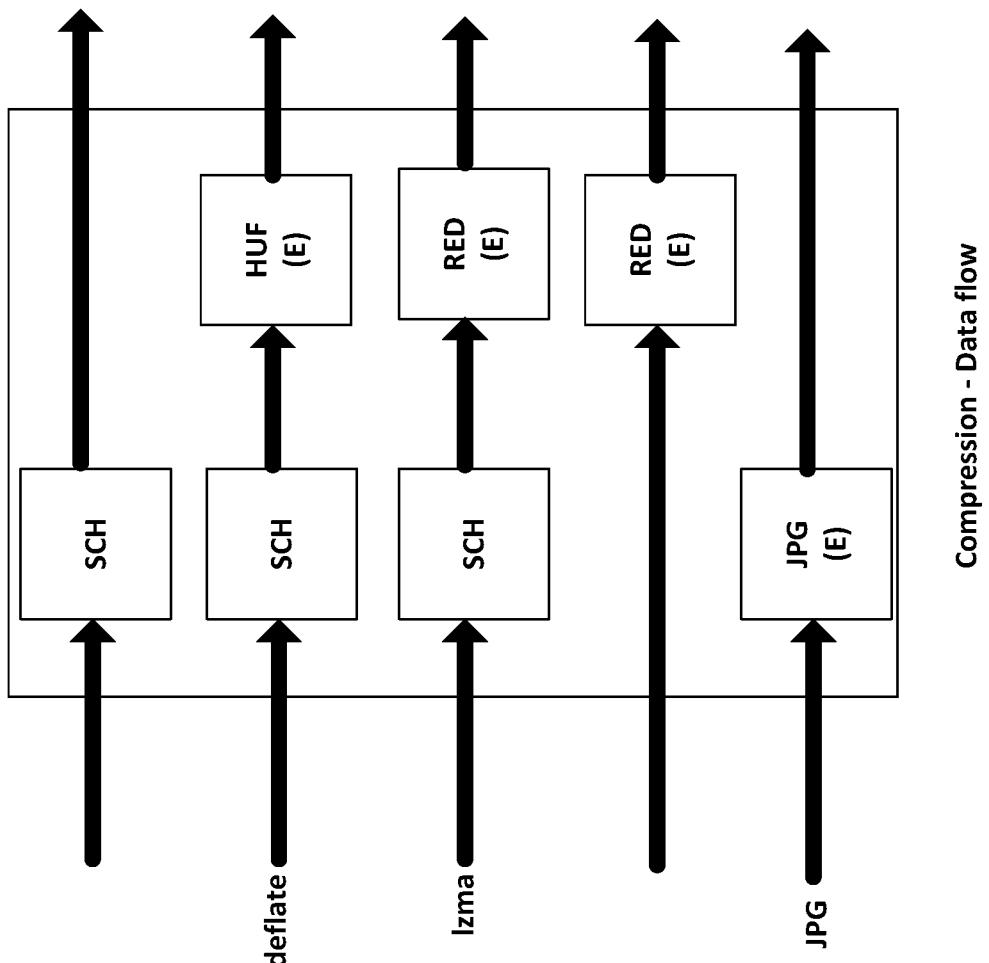

FIGS. 6A and 6B are conceptual diagrams illustrating example data flows through engine blocks within data compression/decompression accelerator 200 of FIG. 5. FIG. 6A illustrates example compression data flows. As illustrated in FIG. 6A, data compression/decompression accelerator 200 may perform dictionary-based compression alone using only search block 206, DEFLATE compression using a combination of search block 206 and the encode portion of Huffman block 210, LZMA compression using a combination of search block 206 and the encode portion of RED block 208, range encoding alone using RED block 208, or JPG re-compression using JPG block 212. FIG. 6B illustrates example decompression data flows. As illustrated in FIG. 6B, data compression/decompression accelerator 200 may perform the first stage of DEFLATE decompression using the decode portion of Huffman block 210, the first stage of LZMA decompression using the decode portion of RED block 208, or JPG decompression using JPG block 212. In the case of both DEFLATE and LZMA decompression, RED block 208 may perform the second stage of decompression, i.e., length-distance pair expansion.

Figure 7:
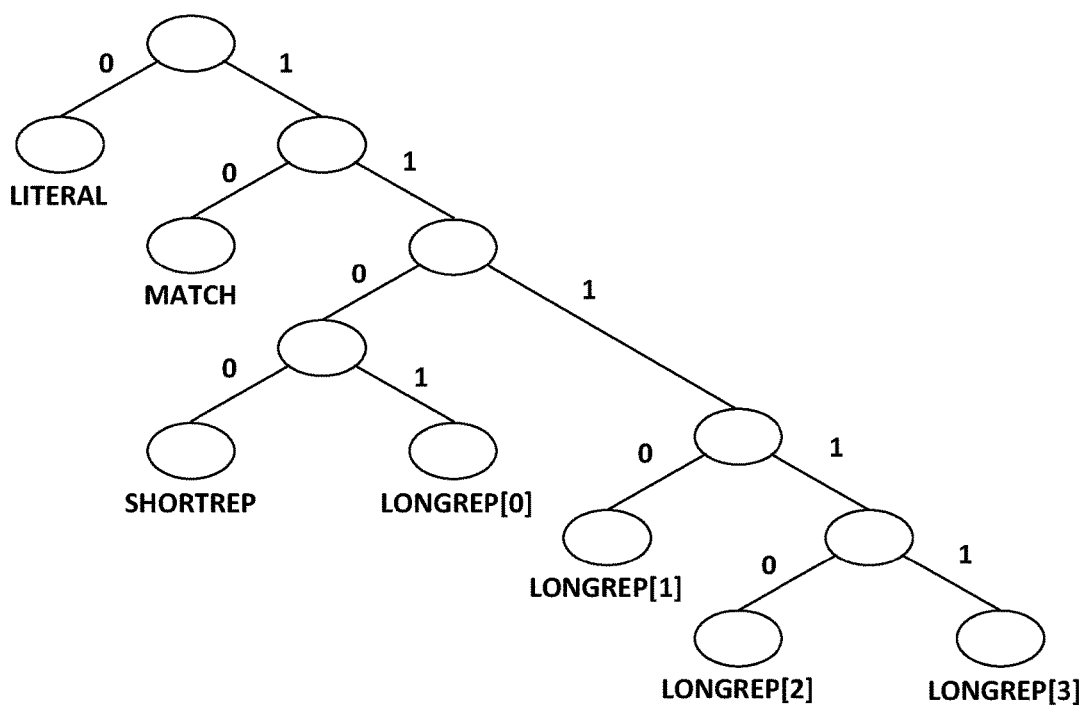
FIG. 7 is a conceptual diagram illustrating an example of a coding tree used for coding in accordance with Lempel-Ziv-Markov chain algorithm (LZMA).

FIG. 7 is a conceptual diagram illustrating an example of a coding tree used for coding in accordance with Lempel-Ziv-Markov chain algorithm (LZMA). For example, RED block 208 encodes (compresses) or decodes (decompresses) a stream of symbols in accordance with the tree illustrated in FIG. 7. Examples of the symbols include literals or length-distance pairs. The literal is a byte string, and a length-distance pair is indicative of a distance value to a previous occurrence of matching byte string and a length value of the match.

In LZMA, the symbols are encoded as a tree of bits with a header, as illustrated in FIG. 7. For example, literals (LIT) are encoded as a 1-bit zero followed by 8 bits of value. Length-distance pairs are categorized into six different variants. RED block 208 stores last four used distance values with start with zero. The last four distance values are presented as LONGREP[0] to LONGREP[3]. LONGREP[0] with 'length=1' is referred to as SHORTREP. If the distance is not one of the last four used distances, RED block 208 encodes it as a MATCH.

Table 1 below illustrates an example of the different bit sequences and the respective packet names and packet description when coding based on the example tree illustrated in FIG. 7.

TABLE 1

| Bit sequence for LZMA | | |
|---|---|---|
| packed code (bit sequence) | packet name | packet description |
| 0 + byteCode | LIT | A single byte encoded using an adaptive binary range coder. |
| 1 + 0 + len + dist | MATCH | A typical LZ77 sequence describing sequence length and distance. |
| 1 + 1 + 0 + 0 | SHORTREP | A one-byte LZ77 sequence. Distance is equal to the last used LZ77 distance. |
| 1 + 1 + 0 + 1 + len | LONGREP[0] | An LZ77 sequence. Distance is equal to the last used LZ77 distance. |
| 1 + 1 + 1 + 0 + len | LONGREP[1] | An LZ77 sequence. Distance is equal to the second last used LZ77 distance. |
| 1 + 1 + 1 + 1 + 0 + len | LONGREP[2] | An LZ77 sequence. Distance is equal to the third last used LZ77 distance. |
| 1 + 1 + 1 + 1 + 1 + len | LONGREP[3] | An LZ77 sequence. Distance is equal to the fourth last used LZ77 distance. |

As described in more detail below, RED block 208 may encode or decode the example plurality of bits (e.g., bit sequence in Table. 1) using context based coding techniques. Prior to describing the example ways in which context values are determined for coding the plurality of bits, the following provides an example of range coding techniques.

Figure 8:
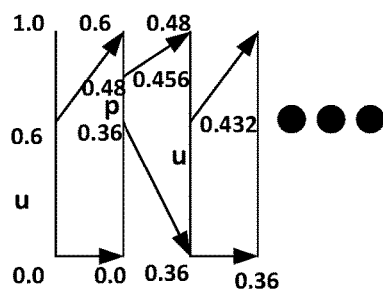
FIG. 8 is a conceptual diagram illustrating an example of range coding or arithmetic coding.

FIG. 8 is a conceptual diagram illustrating an example of range coding or arithmetic coding. In the example illustrated in FIG. 8, the letters u, p, u, n, e, p are being encoded using range coding. In an initial state, the probability of letters u, p, n, and e (e.g., how often these letters are present in the file being encoded) may be unknown, and RED block 208, or possibly one of the processing cores, may initialize a table of probability values so that each letter is initialized with a probability of 0.5. RED block 208, or possibly one of the processing cores, updates the table of probability values after encoding. For instance, as described above, RED block 208 determines an index into the table of probability values using some context values for contexts such as previous symbol or certain offset values described in more detail, reads the probability value from the table, and updates the probability and writes it back if necessary.

As shown in the table illustrated in FIG. 8, assume that RED block 208, or possibly one of the processing cores, determined that the letter u has a frequency of 60%, the letter p has a frequency of 20%, the letter n has a frequency of 10%, and the letter e has a frequency of 10%. Also, as shown in the table illustrated in FIG. 8, RED block 208 assigned apportioned (e.g., divided) a range space such that a sub-portion of the range space for the letter u is 60% of the range space with an interval from 0 to 0.6, a sub-portion of the range space for letter p is 20% of the range space with an interval from 0.6 to 0.8, a sub-portion of the range space for letter n is 10% of the range space with an interval from 0.8 to 0.9, and a sub-portion of the range space for letter e is 10% of the range space with an interval from 0.9 to 1.0.

As described above, as part of range coding, RED block 208 updates a low value and a range value in respective low and range registers. In this example, assume that the encode portion of RED block 208 is encoding u, p, u, n, e, p . . . . Accordingly, RED block 208 initially sets the low value to 0 and range value to 0.6 because u is being encoded an in the original range space, the interval for u was 0 to 0.6.

The 0 to 0.6 now sets the next range space for encoding the letter p. RED block 208 determines the sub-portion for p within the new range space that is from 0 to 0.6. In this example, the letter p is assigned the interval of 0.6 to 0.8. Therefore, RED block 208 determines the sub-portion of p within the 0 to 0.6 range space as 0.36 to 0.48 because the 0.6 to 0.8 interval in a 0 to 1 space for the letter p maps to 0.36 to 0.48 in a 0 to 0.6 scale. RED block 208 updates the low value to 0.36 and the range value to 0.12 because 0.36 plus 0.12 equals 0.48.

The 0.36 to 0.48 sets the new range space for encoding the letter u. RED block 208 determines the sub-portion for u within the new range space that is from 0.36 to 0.48. In this example, the letter u is assigned the interval of 0 to 0.6. Therefore, RED block 208 determines the sub-portion of u within the 0.36 to 0.48 range space as 0.36 to 0.432 because the 0 to 0.6 interval in the 0 to 1 space for the letter u maps to 0.36 to 0.432. RED block 208 keeps the low value equal to 0.36 and updates the range value to 0.072 because 0.36 plus 0.072 equals 0.432.

In the example illustrated in FIG. 8, no contexts are used to determine the probability values. However, in some examples of range coding, RED block 208 may determine context values for one or more contexts and determine the probability values based on the context. Examples of the context and the context values are described in more detail below with respect to LZMA.

Table 2 illustrates an example of the various contexts used for encoding and decoding symbols. The example symbols are those generated for LITERAL, MATCH, SHORTREP, LONGREP[0], LONGREP[1], LONGREP[2], and LONGREP[3]. In the below example, is_match indicates whether a symbol is a literal or the right side of the tree is to be traversed. The is_rep indicates whether the symbol is coded as a match or the right side of the tree is to be traversed. The is_rep0 indicates whether the symbol is coded as SHORTREP or LONGREP[0] or as one of LONGREP[1-3]. The is_rep0_long indicates whether symbol is coded as SHORTREP or LONGREP[0]. The is_rep1 indicates whether the symbol is coded as LONGREP[1] or one of LONGREP[2] or LONGREP[3]. The is_rep2 indicates whether the symbol is coded as LONGREP[2] or LONGREP[3].

TABLE 2

Contexts uses for LZMA coding

| NAME | CONTEXT | USED WHEN | CODING MODE | IF BIT 0 THEN | IF BIT 1 THEN |
|---|---|---|---|---|---|
| Is_match | State, pos_state | Packet start | Bit | LIT | *MATCH |
| Is_rep | State | After bit sequence 1 | Bit | MATCH | *REP |
| Is_rep0 | State | After bit sequence 11 | Bit | SHORTREP/ LONGREP[0] | LONGREP[1-3] |
| Is_rep0_long | State, pos_state | After bit sequence 110 | Bit | SHORTREP | LONGREP[0] |
| Is_rep1 | State | After bit sequence 111 | Bit | LONGREP[1] | LONGREP[2/3] |
| Is_rep2 | State | After bit sequence 1111 | Bit | LONGREP[2] | LONGREP[3] |
| Literal | Prev_byte_1c_msbs, Literal_pos_state, literal_bit_mode [bit position], bit-tree context | After bit sequence 0 | 256 values pseudo- bit-tree | Literal byte value | |

In table 2, for coding Is_match, Is_rep, Is_rep0, Is_rep0_long, Is_rep1, and Is_rep2, RED block 208 uses the context "state," and for Is_match and Is_rep0 long also uses the context "pos_state." The value of pos_state is equal to four least significant bits of the dictionary (e.g., history) position (e.g., the number of bytes coded since the last dictionary reset modulo the dictionary size). The dictionary (e.g., history) position refers to the offset of the byte within the uncompressed data stream. For example, if the data being compressed is "HELLOWORLD," dictionary (e.g., history) position of literal "W" is 5 ("H" is 0, "E" is 1, etc.).

Pos_state is an example of an offset value based on the dictionary reset and dictionary size. Because pos_state includes four least significant bits, there are 16 possible values for pos_state.

The value of "state" is based on the four previous packet types (e.g., whether LIT, MATCH, SHORTREP, or one of LONGREP[0-3]). Table 3 shows the example values of state from 0 to 11 (i.e., there are 12 possible values for the state).

TABLE 3

State Context for LZMA coding

| STATE | 4TH PREVIOUS | 3RD PREVIOUS | 2ND PREVIOUS | PREVIOUS |
|---|---|---|---|---|
| 0 |  | LIT | LIT | LIT |
| 1 |  | MATCH | LIT | LIT |
| 2 | *MATCH | LONGREP[*] / SHORTREP | LIT | LIT |
| 3 | *MATCH / LIT | SHORTREP | LIT | LIT |
| 4 |  |  | MATCH | LIT |
| 5 |  | *MATCH | LONGREP[*] / SHORTREP | LIT |
| 6 |  | LIT | SHORTREP | LIT |
| 7 |  |  | LIT | MATCH |
| 8 |  |  | LIT | LONGREP[*] |
| 9 |  |  | LIT | SHORTREP |
| 10 |  |  | *MATCH | MATCH |
| 11 |  |  | *MATCH | *REP |

For coding a literal, the contexts are prev_byte_lc_msbs, Literal_pos_state, bit position, and bit-tree context. The value of prev_byte_lc_msbs is equal to the four most significant bits of the previous uncompressed byte. The value of literal_pos_state is the same as that of pos_state described above. The literal bit mode is an array of 8 values in the 0-2 range, one for each bit positing in the byte, which are 1 or 2 if the previous packet was a *MATCH and it is either the most significant bit position or all the more significant bits in the literal to encode/decode are equal to the bits in the corresponding positions in match_byte, while otherwise it is 0; the choice between the 1 or 2 values depends on the value of the bit at the same position in match_byte. The bit position indicates where location within the literal_bit_mode array.

The bit-tree context is indicative of an expanding set of probability values that are indicative of the probability values at each level of a bit tree. The bit tree is indicative of the probability of bit being a 0 or a 1 for a series of bits based on probability of previous bit being 0 or 1. For instance, for a first bit in a series of bit there is a probability that its value is 0 or 1. Then for the second (next) bit, there is a probability that its value is 0 based on whether the previous bit was 0 or 1, and a probability that its value is 1 based on whether the previous bit was 0 or 1. For the third bit, there is a probability that the third bit is 0 based on whether the previous bits were 00, 01, 10, or 11, and there is probability that the third bit is 1 based on whether the previous bits were 00, 01, 10, or 11, and so forth for bits.

For example, for first bit, assume there is probability that bit is 0 is P0. For the second bit, there is a first probability P1' based on the first bit being 0, and there is a second probability P1" based on the first bit being 1. For the third bit, for the condition where the first bit is 0, and the second bit is 0, there is a first probability P2'. For the third bit, for the condition where the first bit is 0, and the second bit is 1, there is a second probability P2". For the third bit, for the condition where the first bit is 1, and the second bit is 0, there is a third probability P2'''. For the third bit, for the condition where the first bit is 1, and the second bit is 1, there is fourth probability P2''''. In this example with three bits, the bit-tree context is {P1, P1', P1', P2', P2", P2''', and P2''''}. The bit-tree context can expand for examples with more than three bits.

As described above, in some examples, to decode a current symbol (e.g., literal) the match byte and the previous byte (e.g., prev_byte_lc_msbs) are needed. The match byte value is the byte that would have been decoded if a SHORTREP packet had been used (in other words, the byte found in the history buffer of prior decoded uncompressed data, at the last used distance). It may only be used after a *MATCH packet. The previous byte value is the previously decoded literal byte value. This is the last decoded literal byte when the last decoded LZMA symbol is a literal. Otherwise the previous byte is the last byte of the {L,D} (length-distance) pair after the {L,D} pair is expanded (e.g., copied from history memory) into the uncompressed stream output.

As an example to assist with understanding, similar to above, assume that the data stream (e.g., uncompressed, original stream of literals) is "mnopabcdxyzabcde." There are two instances of "abcd," one after the literal byte "p" and another after the literal byte "z." In one example, as part of encoding the data stream, the second instance of "abcd" may be replaced with a length-distance pair. The result of replacing the second instance of "abcd" with the length-distance pair symbol is "mnopabcdxyz(D=7, L=4)e." In this example, moving back seven literal bytes from the location of D=7 is the beginning of the first instance of "a." Moving four literal bytes forward from the first instance of "a" includes "abcd," which is what (D=7, L=4) replaced. That is, (D=7, L=4) represents the values "abcd" when the length-distance pair symbol (e.g., (D=7, L=4) is expanded).

The history buffer (e.g., memory) of RED block 208 stores "mnopabcdxyz" when RED block 208 is to expand (D=7, L=4). To expand (D=7, L=4), RED block 208 accesses the history buffer that stores "abed" and inserts "abed" into the data stream. Assume that the first instance of "abed" is stored in a first memory location (e.g., first set of contiguous memory locations).

For decoding the values of "e," RED block 208 may need the previous byte and the match byte. In this example, "d" is the previous byte because it is immediately previous to "e." The literal "x" is the match byte because it immediately follows the set of bytes that were used to expand the length-distance pair symbol (e.g., "x" is after the first instance of "abed" and the first instance of "abed" was used to expand the (D=7, L=4) length-distance pair symbol).

In some examples, to retrieve the previous byte, RED block 208 may wait until the (D=7, L=4) length-distance pair symbol is expanded and the values, including "d," are stored in the history buffer. RED block 208 then retrieves the previous byte (e.g., "d"). For example, RED block 208 generates a pointer value that points to a second memory location (e.g., second set of contiguous memory locations) where the "abed" values represented by (D=7, L=4) are stored.

However, the history buffer already stored "d." For instance, "d" is stored in the first memory location (e.g., one of the first set of contiguous memory locations). In one or more examples, a pointer conversion circuit may convert the pointer value to a converted pointer value that identifies the first memory location instead of the second memory location. RED block 208 then retrieves the values from the first memory location.

FIG. 9 is a block diagram illustrating an example of a range decoder. As illustrated, RED block 208 includes decoder circuit 302, queue circuit 304 having associated pointer conversion circuit 306, queue circuit 308 having associated pointer conversion circuit 310, memory manager circuit 312, history buffer (e.g., memory) 314, and expander circuit 316. RED block 208 may optionally include hit detection circuit 318 to further reduce latency. Although two queue circuits 304, 308 and two pointer conversion circuits 306, 310 are illustrated, in some examples, there may be more or fewer queue circuits and more or fewer conversion circuits than illustrated in FIG. 9. The various circuits are illustrated as separate circuits to ease with illustration, but one or more of the circuits may be combined together.

Decoder circuit 302 receives the current symbol for decoding. Queue circuit 304 stores the previous symbol (e.g., literal or length-distance (LD) pair). Queue circuit 308 stores the one before the previous symbol (e.g., literal or LD pair). For example, the current symbol may be considered as the Nth symbol in the data stream. Queue circuit 304 (e.g., first queue circuit) stores information indicative of parameters of the N-1 symbol, and queue circuit 308 (e.g., second queue circuit) stores information indicative of parameters of the N-2 symbol. One example of the parameters of the symbol are the length and distance values for the LD pair symbols. Another example of the parameters of the symbol may be the actual values of the symbol for literal symbols.

Memory manager circuit 312 is configured to access history buffer 314. History buffer 314 stores values represented by symbols in the data stream. Expander circuit 316 is configured to expand symbols (e.g., insert values for LD pair from history buffer 314). In some examples, memory manager circuit 312 and expander circuit 316 may be combined into one circuit.

In this way, FIG. 9 illustrates a pipeline that includes decoder circuit 302 (e.g., LZMA bit decoder) followed by two queueing stages (e.g., queue circuit 304 (Q1) and queue circuit 308 (Q0)) that store the decoded literals or {L, D} pairs. The second stage of the queue (e.g., queue circuit 308) drives the logic of memory manager circuit 312 and/or expander circuit 316 that assembles the decoded literal or copies the pointed string from history buffer 314 when it is driven with a {L, D} pair in to the output stream. The bytes pushed in to the decoded output stream are also pushed into history buffer 314. In other words, values that are inserted for the symbols to expand the symbols are stored back into history buffer 314.

LZMA packets vary in size from 4b (SHORTREP) to 49b (MATCH). It can take from 1 cycle (Literal) to 18 cycles ({L, D} pair with length of 273B for memory manager circuit 312 and expander circuit 316 to complete the expansion of the decoded L/LD pair outputted by queue circuit 308. To keep decoder circuit 302 without getting stalled by the memory manager circuit 312 and expander circuit 316, queue circuit 304 and queue circuit 308 are used. For example, if queue circuit 304 and queue circuit 308 were not present, then decoder circuit 302 would always stall waiting for memory manager circuit 312 and expander circuit 316 to complete.

By having queue circuit 304 and queue circuit 308, it is possible for decoder circuit 302 to start decoding a current symbol while memory manager circuit 312 and expander circuit 316 perform their respective operations. However, even with queue circuit 304 and queue circuit 308, there can be delays in the ability of decoder circuit 302 to perform decoding, such as due to decoder circuit 302 needing previous bytes that are unavailable because memory circuit 312 and expander circuit 316 have not yet expanded one or more previous symbols.

For example, for decoder circuit 302 (e.g., the LZMA decoder) to continue the decode of the bits belonging to current symbol (e.g., literal or length-distance pair), decoder circuit 302 may need to obtain the previous_byte if the current symbol is determined to be a LITERAL that is following a previously decoded LITERAL. This is required for fetching the correct context value (e.g., to determine probability) to be used for range decoding the bits belonging to the current symbol. In this case match_byte is not needed and decoder circuit 302 itself buffers the previously decoded literal to avoid stall cycles. However, when the current symbol is a LITERAL that follows a previously decoded {L, D} pair (one of the other LZMA packet types: SHORTREP, LONGREP* or MATCH) both match_byte and previous_byte values are needed for fetching the correct context values.

In this condition the previous byte and the match byte may not readily be available to decoder circuit 302 until the {L, D} pair that was just decoded is expanded by expander circuit 316 and then re-stored back into history buffer 314 at the next buffer location. If decoder circuit 302 is to wait for expander circuit 316 to expand the {L, D} pair, decoder circuit 302 would be stalled for several cycles resulting in performance penalty.

In accordance with one or more examples described in this disclosure, one or more pointer conversion circuit (e.g., pointer conversion circuit 306 and pointer conversion circuit 310) convert the pointer values to the match_byte and previous_byte generated by decoder circuit 302 (e.g., in the LZMA Decoder History Space) across the queueing stages (e.g., queue circuit 304 and queue circuit 308) and provides the converted pointer value to memory manager circuit 312, so that memory manager circuit 312 can locate and return these bytes directly from history buffer 314. This conversion process takes a couple cycles compared to the several tens of cycles penalty which would be incurred otherwise.

For example, decoder circuit 302 is configured to decode a current symbol of the data stream based on values represented by one or more previous symbols that are prior to the current symbol in the data stream (e.g., match_byte and previous_byte). One or more pointer conversion circuits (e.g., pointer conversion circuit 306 and pointer conversion circuit 310) are configured to determine one or more locations within history buffer 314 that store the values represented by the one or more previous symbols of the data stream prior to or in parallel with expander circuit 316 inserting the values represented by the one or more previous symbols into the data stream. Decoder circuit 302 is configured to receive, from history buffer 314, the values represented by the one or more previous symbols based on the locations within history buffer 314 determined by the one or more pointer conversion circuits.

For instance, as illustrated in FIG. 9, memory manager circuit 312 outputs the match byte and the previous byte to decoder circuit 302. In some examples, memory manager circuit 312 outputs the match byte and previous byte to decoder circuit 302 through hit detection circuit 318. Hit detection circuit 318 may be optional, and in examples where hit detection circuit 318 is not used, memory manager circuit 312 may output to decoder circuit 302.

Hit detection circuit 318 may provide a bypass option. For instance, in some cases, described below, there is a possibility that the value that needs to be fed back to decoder circuit 302 is already stored in queue circuit 304 or queue circuit 308. In such cases, rather than accessing history buffer 314, it may be possible to retrieve the values from queue circuit 304 or queue circuit 308. For instance, hit detection circuit 318 may be a MUX circuit, where the output from hit detection circuit 318 is the values stored in queue circuit 304 or queue circuit 308, if the needed value is already stored in queue circuit 304 or queue circuit 308, or from history buffer 314 via memory manager circuit 312, if the needed value is not already stored in queue circuit 304 or queue circuit 308.

The following describes example ways in which pointer conversion circuit 306 and pointer conversion circuit 310 convert a pointer value to a converted pointer value that identifies locations in history buffer 314. The pointer conversion algorithm described below occurs for both pointer conversion circuit 306 and pointer conversion circuit 310. In the below, "pointer" refers to the pointer value that pointer conversion circuit 306 or pointer conversion circuit 310 receives and "converted pointer" refers to the converted pointer value that pointer conversion circuit 306 or pointer conversion circuit 310 outputs.

For example, pointer conversion circuit 306 receives a pointer value from decoder circuit 302. One example of the pointer value is match byte pointer, and another example of the pointer value is previous byte pointer. In this example, "pointer" refers to match byte pointer or previous byte pointer. The algorithm described below may be the same for the match byte pointer or the previous byte pointer. The output from pointer conversion circuit 306 is a first converted pointer value. For example, match byte pointer1 and previous byte pointer1 are each examples of the first converted pointer value. In this example, match byte pointer1 and previous byte pointer1 may be considered as "converted_pointer."

Pointer conversion circuit 310 receives the output from pointer conversion circuit 306. Accordingly, for pointer conversion circuit 310, "pointer" may be match byte pointer1 and/or previous byte pointer1. Pointer conversion circuit 310 outputs match byte pointer0 and previous byte pointer0. Accordingly, for pointer conversion circuit 310, "converted_pointer" refers to match byte pointer0 and/or previous byte pointer0.

Memory manager circuit 312 receives previous byte pointer0 and match byte pointer0. Memory manager circuit 312 retrieves values stored in history buffer 314 based on previous byte pointer0 and match byte pointer0.

In the following, queued entry indicates the literal or {L, D} pair queued at queue circuit 304 or queue circuit 308 for the associated (e.g., corresponding) pointer conversion circuit 306 and pointer conversion circuit 310, respectively. For example, the manner in which pointer conversion circuit 306 and pointer conversion circuit 310 convert a pointer value may be based on whether the associated (e.g., corresponding) queue circuit 304 or queue circuit 308 stores a literal or length and distance parameters of an {L, D} pair. Also, pointer conversion circuit 306 and pointer conversion circuit 310 may utilize the length and distance parameters to convert the pointer value.

In some examples, the distance parameter is a value starting from 0 to H-1, where H is the history size of history buffer 314. A value of 0 in D indicates that {L, D} pair is pointing to immediately prior byte in history. Also, the value of L of the {L, D} pair is never 0. The value of L may be from 1 to 273, where 273 is the maximum length value that be held by a {L, D} pair encoded as a LZMA packet.

As a first case, queued_entry is not valid (e.g., no queued entry). Since there is not queued entry, the outputted pointer value is the same as the input pointer value (e.g., converted_pointer=pointer). For example, if queue circuit 304 does not store a literal or {L, D} pair, then pointer conversion circuit 306 does not perform any conversion, and match byte pointer1 equals match type pointer and previous byte pointer1 equals previous byte pointer. If queue circuit 308 does not store a literal or {L, D} pair, then pointer conversion circuit 310 does not perform any conversion, and match byte pointer0 equals match byte pointer1 and previous byte pointer0 equals previous byte pointer0.

As a second case, queued entry is literal. In this case, if pointer is zero, then converted_pointer equals pointer. For example, if queue circuit 304 stores a literal and match byte pointer is zero (e.g., pointer value is zero), then match byte pointer1 equals match byte pointer. If queue circuit 308 stores a literal and match byte pointer1 is zero, then match byte pointer0 equals match byte pointer1. Similarly, if queue circuit 304 stores a literal and previous byte pointer is zero (e.g., pointer value is zero), then previous byte pointer1 equals previous byte pointer. If queue circuit 308 stores a literal and previous byte pointer1 is zero, then previous byte pointer0 equals previous byte pointer1.

Where the queued_entry is a literal and the pointer is 0 is a special case and the pointed byte is in the queue stage (e.g., the byte needed by decoder circuit 302 is queue circuit 304 or queue circuit 308). The converted pointer is kept the same as pointer. However, hit detection circuit 318 returns the byte stored in the queue circuit 304 or queue circuit 308 instead of the byte returned by memory manager circuit 312.

In the second case, where the queued entry is literal, and pointer is greater than zero, then converted_pointer equals (pointer−1). For example, if queue circuit 304 stores a literal and match byte pointer is greater than zero, then match byte pointer1 equals match byte pointer minus one. If queue circuit 308 stores a literal and match byte pointer1 is greater than zero, then match byte pointer0 equals match byte pointer1 minus one. Similarly, if queue circuit 304 stores a literal and previous byte pointer is greater than zero, then previous byte pointer1 equals previous byte pointer minus one. If queue circuit 308 stores a literal and previous byte pointer1 is greater than zero, then previous byte pointer0 equals previous byte pointer1 minus one.

In a third case, queued_entry is a {L, D} pair. If the pointer is greater than or equal to the length parameter (L), then the converted_pointer is equal to (pointer−L). The pointer points to a byte before the queued {L, D} pair, and so converted by subtracting the length of the queued {L, D} pair. For example, if queue circuit 304 stores a {L, D} pair and match byte pointer is greater than or equal to L, then match byte pointer1 equals match byte pointer minus L. If queue circuit 308 stores a {L, D} pair and match byte pointer1 is greater than or equal to L, then match byte pointer0 equals match byte pointer1 minus L. Similarly, if queue circuit 304 stores a {L, D} pair and previous byte pointer is greater than or equal to L, then previous byte pointer1 equals previous byte pointer minus L. If queue circuit 308 stores a {L, D} pair and previous byte pointer1 is greater than or equal to L, then previous byte pointer0 equals previous byte pointer1 minus L.

For the third case, where the queued entry is a {L, D} pair, if the pointer is equal to (L−1), then converted_pointer is equal to D. The pointer points to the first byte of the {L, D} pair. This is pointed to by the distance D of the {L, D} pair in history buffer 314 prior to it. For example, if queue circuit 304 stores a {L, D} pair and match byte pointer is equal to (L−1), then match byte pointer1 equals D. If queue circuit 308 stores a {L, D} pair and match byte pointer1 is equal to (L−1), then match byte pointer0 equals D. Similarly, if queue circuit 304 stores a {L, D} pair and previous byte pointer is equal to (L−1), then previous byte pointer1 equals D. If queue circuit 308 stores a {L, D} pair and previous byte pointer1 is equal to (L−1), then previous byte pointer0 equals D.

For the third case, where the queued_entry is a {L, D} pair, if the pointer is less than (L−1) AND (L−1) is less than equal to D, then converted_pointer equals D−((L−1)−pointer). In other words, if pointer is <(L−1) AND (L−1) is <=D, then converted_pointer=D−((L−1)−pointer). The pointer points to a byte within the {L, D} pair and the length L of the {L, D} pair is <=(D+1). This indicates that {L, D} pair results in exact string copy during expansion and the pointed byte can be located by using its offset from D.

For example, if queue circuit 304 stores a {L, D} pair and match byte pointer is less than (L−1) AND (L−1) is less than or equal to D, then match byte pointer1 equals D−((L−1)−match byte pointer). If queue circuit 308 stores a {L, D} pair and match byte pointer1 is less than (L−1) AND (L−1) is less than or equal to D, then match byte pointer0 equals D−((L−1)−match byte pointer1). Similarly, if queue circuit 304 stores a {L, D} pair and previous byte pointer is less than (L−1) AND (L−1) is less than or equal to D, then previous byte pointer1 equals D−((L−1)−previous byte pointer). If queue circuit 308 stores a {L, D} pair and previous byte pointer1 is less than (L−1) AND (L−1) is less than or equal to D, then previous byte pointer0 equals D−((L−1)−previous byte pointer1).

The following describes sub-cases for third case where the queued entry is a {L, D} pair and where the pointer is less than (L−1) AND (L−1) is greater than D (i.e., pointer is <(L−1) AND (L−1) is >D). In this case, the pointer points to a byte within the {L, D} pair and the length L of the {L, D} pair is >(D+1). This indicates that {L, D} pair results in repeated short string copy during expansion (source string is smaller than the copy length). This results in the following sub cases. For these cases following remainders which are required to locate the byte pointed within the short source string, are calculated with modulo division.

$$ldp\_rem = L\%(D+1)$$

ldp_rem indicates the number of characters copied as a partial string at the end of the expansion of the {L, D} pair.

$$ptr\_rem = ((pointer+1) - ldp\_rem)\%(D+1))$$

ptr_rem provides the offset of the pointed character within the short string under the condition (pointer+1) >=ldp_rem.

For a first sub-case of where pointer is >(L−1) AND (L−1) is >D, D is equal to 0. In this case, converted pointer=D. For example, match byte pointer1 or previous byte pointer1 is equal to D, where the D parameter in queue circuit 304 is zero. Similarly, match byte pointer0 or previous byte pointer0 is equal to D, where the D parameter in queue circuit 308 is zero. This is a special case of single character repeat copy performed during the expansion of this {L, D} pair. Since all the characters within the copied string are same and pointed to by D, converted pointer is set as D.

For a second sub-case of where (D>0) AND pointer is <ldp_rem, converted_pointer=D−(ldp_rem−(pointer+1). In this case pointer remains within remainder of the short string copied at the end during expansion. So, converted pointer is set to the same offset from D. Similar to above, the example of pointer is match byte pointer and previous byte pointer for pointer conversion circuit 306, and the L and D values are the length and distance parameters stored in queue circuit 304. Another example of pointer is match byte pointer1 and previous byte pointer1 for pointer conversion circuit 310, and the L and D values are length and distance parameters stored in queue circuit 308.

For a third sub-case of where (D>0) AND pointer is >=ldp_rem, in this case, pointer remains above the remainder of the short string copied during the repeated copy during expansion. There are multiple sub-cases here.

For the first sub-case of the third sub-case of the third case, if ptr_rem is 0, then converted pointer is equal to D. In this example, ptr_rem being zero indicates pointer is pointing to the first byte of the {L, D} pair. So, converted pointer is set to D. For the second sub-case of the third sub-case of the third case, if ptr_rem is >0, then converted pointer is equal to (ptr_rem−1). As the ptr_rem directly provides the offset of the pointed character, converted pointer is directly set from it.

In this manner, FIG. 9 illustrates an example of a first queue circuit (e.g., queue circuit 304) and a second queue circuit (e.g., queue circuit 308). In this example, the current symbol (e.g., symbol being decoded by decoder circuit 302) is the Nth symbol in the data stream, queue circuit 304 stores information indicative of parameters of the N-1 symbol (e.g., literal or length, distance parameters), and queue circuit 308 stores information indicative of parameters of the N-2 symbol.

A first pointer conversion circuit (e.g., pointer conversion circuit 306) associated with a first queue circuit (e.g., queue circuit 304) is configured to receive, from decoder circuit 302, a first pointer value (e.g., match byte pointer) and a second pointer value (e.g., previous byte pointer). The first pointer value and the second pointer value are indicative of where values used for decoding the current symbol are to be retrieved from the memory (e.g., history buffer 314). Pointer conversion circuit 306 is configured to convert the first pointer value (e.g., match byte pointer) into a first converted pointer value (e.g., match byte pointer1) and the second pointer value (e.g., previous byte pointer) into a second converted pointer value (e.g., previous byte pointer1) based on information indicative of parameters of the N-1 symbol stored in queue circuit 304 (e.g., perform the operations of the cases described above to perform the conversion). Pointer conversion circuit 306 is configured to output the first converted pointer value (e.g., match byte pointer1) and the second converted pointer value (e.g., previous byte pointer1) to the second pointer conversion circuit (e.g., pointer conversion circuit 310).

Pointer conversion circuit 310 is configured to receive the first converted pointer value (e.g., match byte pointer1) and the second converted pointer value (e.g., previous byte pointer1), and convert the first converted pointer value (e.g., match byte pointer1) into a third converted pointer value (e.g., match byte pointer0) and the second converted pointer value (e.g., previous byte pointer1) into a fourth converted pointer value (e.g., previous byte pointer0) based on information indicative of parameters of the N-2 symbol stored in the queue circuit 310.

Memory manager circuit 312 is configured to determine one or more locations in the memory (e.g., history buffer 314) based on the third converted pointer value (e.g., match byte pointer0) and the fourth converted pointer value (e.g., previous byte pointer0). Memory manager circuit 312 is configured to output the values represented by the one or more previous symbols stored in the determined one or more locations to decoder circuit 302 for decoder circuit 302 to decode the current symbol.

Figure 10:
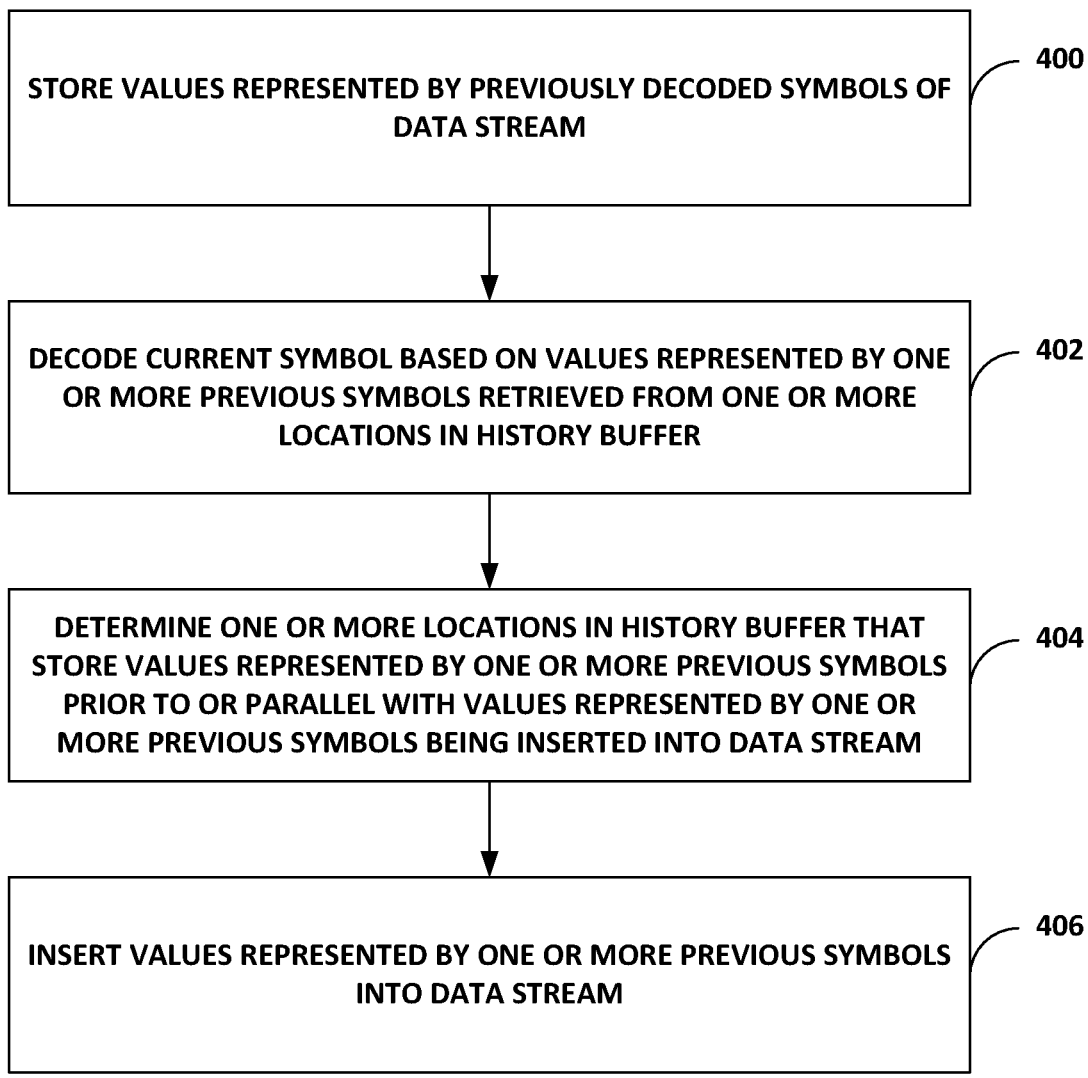
FIG. 10 is a flowchart illustrating one or more example method of operations in accordance with this disclosure.

FIG. 10 is a flowchart illustrating example method of operation of a device in accordance with this disclosure. In this example, as RED block 208 performs its decoding operations, history buffer 314 (e.g., memory) is configured to store values represented by symbols in a data stream (400). For example, history buffer 314 store literals that form the actual values of the uncompressed, original data stream. For instance, as per the above examples, history buffer 314 may store "mnopabcdxyz," where each letter is a literal byte.

The original data stream is mnopabcdxyzabcde, and the second instance of abcd may be replaced with (D=7, L=4).

Decoder circuit 302 may be configured to decode the current symbol of the data stream based on the values represented by the one or more previous symbols that are prior to the current symbol in the data stream (404). To decode the current symbol, prior to or in parallel with expander circuit 316 inserting values represented by the one or more previous symbols in the data stream, decoder circuit 302 receives, from history buffer 314 (e.g., via hit detection circuit 318, where applicable) the values represented by the one or more previous symbols. Decoder circuit 302 may determine context values based on the values represented by the one or more previous symbols. Decoder circuit 302 may decode the current symbol based on the determined context values (e.g., using the example techniques described above).

One or more pointer conversion circuits (e.g., pointer conversion circuit 306 and pointer conversion circuit 310) may be configured to determine one or more locations in the memory that store values represented by one or more previous symbols of the data stream prior to or in parallel with the values represented by the one or more previous symbols being inserted into the data stream (402). For example, the one or more pointer conversion circuits receive a pointer value indicative of where values used for decoding the current symbol are to retrieved from history buffer 314 (e.g., pointer conversion circuit 306 receives the match byte pointer and the previous byte pointer). The match byte pointer and the previous byte pointers may identify locations in history buffer 314 where the values represented by the one or more previous symbols are to be stored in the memory after expander circuit 316 inserts the values represented by the one or more previous symbols into the data stream.

The match byte pointer is for a match byte, and the previous byte pointer is the for the previous byte. The match byte may be, as one example, values that are immediately subsequent to a set of values in the data stream defined by length and distance parameters of one or more of the previous symbols. The previous byte may be, as one example, values in the data stream that are immediately prior to the current symbol.

The one or more pointer conversion circuits convert the pointer value into a converted pointer value based on whether the one or more previous symbols are a literal symbol or a length-distance symbol (e.g., {L, D} pair) to determine the one or more locations in history buffer 314. For example, pointer conversion circuit 306 outputs match byte pointer1 and previous byte pointer1 to pointer conversion circuit 310. Pointer conversion circuit 310 outputs match byte pointer0 and previous byte pointer0. The manner in which pointer conversion circuit 306 and pointer conversion circuit 310 perform the conversion is based on whether queue circuit 304 and queue circuit 308 store a literal or a length-distance pair, respectively, such as performing the operations described above with respect to the different cases and sub-cases.

In some example, based on the one or more previous symbols being the length-distance symbol, the one or more conversion circuits may convert the pointer value based on at least one of a length parameter or distance parameter of the length-distance symbol. For example, as described above, in the various cases, the value of L (e.g., length parameter) and D (e.g., distance parameter) are parameters that are used to determine the converted pointer value (e.g., converted_pointer).

Expander circuit 316 may insert values represented by the one or more previous symbols into the data stream (e.g., subsequent to or in parallel with the one or more pointer conversion circuits determining the one or more locations in history buffer 314 that store the values represented by the one or more previous symbols of the data stream) (406). For example, while decoder circuit 302 is starting to decode the current symbol (e.g., determining the context values based on previous byte and match byte), expander circuit 316 inserts the values represented by the one or more previous symbols. For instance, keeping with the above examples, expander circuit 316 may insert the values of "abcd" in for the (D=7, L=4) length-distance symbol while decoder circuit 302 begins to determine the previous byte and match byte values for decoding "e." In some examples, expander circuit 316 and/or memory manager circuit 312 also store the values inserted into the data stream back into history buffer 314.

Various examples have been described. These and other examples are within the scope of the following claims.

What is claimed is:

1. An integrated circuit for context-coding, the integrated circuit comprising:
    a range decoder circuit comprising:
        a history buffer configured to store values represented by symbols in a data stream;
        an expander circuit configured to insert the stored values into the data stream to expand the symbols in the data stream;
        a decoder circuit configured to decode a current symbol of the data stream based on values represented by one or more previous symbols that are prior to the current symbol in the data stream; and
        one or more pointer conversion circuits configured to convert one or more pointer values to one or more converted pointer values based on whether the one or more previous symbols are a literal symbol or a length-distance symbol, wherein the one or more pointer values are indicative of a first set of one or more locations within the history buffer where the values represented by the one or more previous symbols used for decoding the current symbol are to be retrieved from the history buffer after the values represented by the one or more previous symbols are stored in the first set of one or more locations, wherein the one or more converted pointer values are indicative of a second set of one or more locations within the history buffer that already store the values represented by the one or more previous symbols of the data stream prior to the first set of one or more locations storing the values represented by the one or more previous symbols, and wherein the one or more pointer conversion circuits are configured to convert the one or more pointer values into the one or more converted pointer values in parallel with the expander circuit inserting the values represented by the one or more previous symbols into the data stream,
        wherein the decoder circuit is configured to receive, from the history buffer, the values represented by the one or more previous symbols based on the second set of one or more locations within the history buffer indicated by the one or more converted pointer values.

2. The integrated circuit of claim 1, wherein the expander circuit is configured to insert values represented by the one or more previous symbols into the data stream subsequent to or in parallel with the one or more pointer conversion circuits converting the one or more pointer values into the one or more converted pointer values.

3. The integrated circuit of claim 1, wherein the one or more pointer conversion circuits are configured to:
  receive the one or more pointer values indicative of the first set of one or more locations within the history buffer where the values represented by the one or more previous symbols used for decoding the current symbol are to be retrieved from the history buffer.

4. The integrated circuit of claim 1, wherein to convert the one or more pointer values, the one or more point conversion circuits are configured to:
  based on the one or more previous symbols being the length-distance symbol, convert the one or more pointer values based on at least one of a length parameter or distance parameter of the length-distance symbol.

5. The integrated circuit of claim 1, wherein the values represented by the one or more previous symbols include at least one of:
  a match byte, wherein the match byte comprises values that are immediately subsequent to a set of values in the data stream defined by length and distance parameters of one or more of the previous symbols; and
  a previous byte, wherein the previous byte comprises values in the data stream that are immediately prior to the current symbol.

6. The integrated circuit of claim 1, further comprising:
one or
  more queue circuits configured to store information indicative of parameters of the one or more previous symbols, wherein each of the one or more queue circuits is associated with a respective one of the one or more pointer conversion circuits,
  wherein to convert the one or more pointer values into the one or more converted pointer values, the one or more pointer conversion circuits are configured to convert the one or more pointer values into the one or more converted pointer values based on the parameters of the one or more previous symbols stored in respective ones of the one or more queue circuits.

7. The integrated circuit of claim 1, wherein to decode the current symbol, the decoder circuit is configured to:
  determine context values based on the values represented by the one or more previous symbols; and
  decode the current symbol based on the determined context values.

8. The integrated circuit of claim 1, wherein the one or more pointer values comprise a first pointer value and a second pointer value, the integrated circuit further comprising:
  a first queue circuit and a second queue circuit,
  wherein the current symbol is an Nth symbol in the data stream, the first queue circuit stores information indicative of parameters of an N-1 symbol, and the second queue circuit stores information indicative of parameters of an N-2 symbol,
  wherein the one or more pointer conversion circuits comprise a first pointer conversion circuit associated with the first queue circuit and a second conversion circuit associated with the second queue circuit,
  wherein the first pointer conversion circuit is configured to:
    receive, from the decoder circuit, the first pointer value and the second pointer value, wherein the first pointer value and the second pointer value are indicative of two locations of the first set of one or more locations within the history buffer where the values represented by the one or more previous symbols used for decoding the current symbol are to be retrieved from the history buffer;
    convert the first pointer value into a first converted pointer value and the second pointer value into a second converted pointer value based on information indicative of parameters of the N-1 symbol stored in the first queue circuit; and
    output the first converted pointer value and the second converted pointer value to the second pointer conversion circuit,
  wherein the second conversion circuit is configured to:
    receive the first converted pointer value and the second converted pointer value; and
    convert the first converted pointer value into a third converted pointer value and the second converted pointer value into a fourth converted pointer value based on information indicative of parameters of the N-2 symbol stored in the second queue circuit, wherein the third converted pointer value is one of the one or more converted pointer values and the fourth converted pointer value is another one of the one or more converted pointer values,
  wherein the integrated circuit further comprises a memory manager circuit configured to:
    output the values represented by the one or more previous symbols stored in the second set of one or more locations to the decoder circuit for the decoder circuit to decode the current symbol.

9. The integrated circuit of claim 1, wherein the current symbol comprises a first symbol, the integrated circuit further comprising:
  one or more queue circuits configured to store information indicative of parameters of the one or more previous symbols, wherein each of the one or more queue circuits is associated with a respective one of the one or more pointer conversion circuits;
  a hit detection circuit configured to output parameters of the one or more previous symbols from the one or more queue circuit rather than from the history buffer for the decoder circuit to decode a second symbol based on the parameters of the one or more previous symbols being values needed to decode the second symbol.

10. The integrated circuit of claim 1, further comprising a memory manager circuit coupled to the history buffer and the expander circuit,
  wherein the one or more pointer conversion circuits, in parallel with the expander circuit inserting the values represented by the one or more previous symbols into the data stream, are configured to:
    output the one or more converted pointer values to the memory manger circuit,
  wherein the memory manager circuit, in parallel with the expander circuit inserting the values represented by the one or more previous symbols into the data stream, retrieves the values represented by the one or more previous symbols from the history buffer based on the one or more converted pointer values, and
  wherein the expander circuit, subsequent to or in parallel with the one or more pointer conversion circuits converting the one or more pointer values into the one or more converted pointer values, is configured to:
    receive the values represented by the one or more previous symbols from the memory manager circuit; and insert the values represented by the one or more previous symbols into the data stream.

11. A method for context-coding with an integrated circuit, the method comprising:
storing, with a history buffer of the integrated circuit, values represented by symbols in a data stream;
converting, with one or more pointer conversion circuitry, one or more pointer values to one or more converted pointer values based on whether one or more previous symbols are a literal symbol or a length-distance symbol, wherein the one or more previous symbols are prior to a current symbol in the data stream, wherein the one or more pointer values are indicative of a first set of one or more locations within the history buffer where values represented by the one or more previous symbols used for decoding the current symbol of the data stream are to be retrieved from the history buffer after the values represented by the one or more previous symbols are stored in the first set of one or more locations, and wherein the one or more converted pointer values are indicative of a second set of one or more locations within the history buffer that already store the values represented by the one or more previous symbols of the data stream prior to the first set of one or more locations storing the values represented by the one or more previous symbols;
decoding, with a decoder circuit of the integrated circuit, the current symbol of the data stream based on the values represented by one or more previous symbols that are prior to the current symbol in the data stream, wherein decoding the current symbol comprises,
in parallel with an expander circuit inserting the values represented by the one or more previous symbols into the data stream receiving, from the history buffer, the values represented by the one or more previous symbols based on the second set of one or more locations within the history buffer indicated by the one or more converted pointer values; and
inserting, with the expander circuit, the values represented by the one or more previous symbols into the data stream to expand the one or more previous symbols, wherein converting, with one or more pointer conversion circuitry, one or more pointer values to one or more converted pointer values comprises converting the one or more pointer values to the one or more converted pointer values in parallel with the expander circuit inserting the values represented by the one or more previous symbols into the data stream.

12. The method of claim 11, wherein inserting the values represented by the one or more previous symbols into the data stream comprises inserting the values represented by the one or more previous symbols subsequent to or in parallel with converting the one or more pointer values into the one or more converted pointer values.

13. The method of claim 11, wherein converting the one or more pointer values into the one or more converted pointer values comprises: receiving the one or more pointer values indicative of the first set of one or more locations within the history buffer where the values represented by the one or more previous symbols used for decoding the current symbol are to be retrieved from the history buffer.

14. The method of claim 11, wherein converting the one or more pointer values comprises:
based on the one or more previous symbols being the length-distance symbol, converting the one or more pointer values based on at least one of a length parameter or distance parameter of the length-distance symbol.

15. The method of claim 11, wherein the values represented by the one or more previous symbols include at least one of:
a match byte, wherein the match byte comprises values that are immediately subsequent to a set of values in the data stream defined by length and distance parameters of one or more of the previous symbols; and
a previous byte, wherein the previous byte comprises values in the data stream that are immediately prior to the current symbol.

16. The method of claim 11, further comprising: storing, with
one or more queue circuits, information indicative of parameters of the one or more previous symbols, wherein each of the one or more queue circuits is associated with a respective one of the one or more pointer conversion circuits,
wherein converting the one or more pointer values into the one or more converted pointer values comprises converting the one or more pointer values into the one or more converted pointer values based on the parameters of the one or more previous symbols stored in respective ones of the one or more queue circuits.

17. The method of claim 11, wherein decoding the current symbol comprises:
determining context values based on the values represented by the one or more previous symbols; and
decoding the current symbol based on the determined context values.

18. The method of claim 11, wherein the one or more pointer values comprise a first pointer value and a second pointer value, and wherein the current symbol is an Nth symbol in the data stream, the method further comprising:
storing, in a first queue circuit, information indicative of parameters of an N-1 symbol, and storing, in a second queue circuit, information indicative of parameters of an N-2 symbol,
wherein converting, with one or more pointer conversion circuits, the one or more pointer values into the one or more converted pointer values comprises:
receiving, with a first pointer conversion circuit and from the decoder circuit, receive, the first pointer value and the second pointer value, wherein the first pointer value and the second pointer value are indicative of two locations of the first set of one or more locations within the history buffer where the values represented by the one or more previous symbols used for decoding the current symbol are to be retrieved from the history buffer, and wherein the first pointer conversion circuit is associated with the first queue circuit;
converting, with the first pointer conversion circuit, the first pointer value into a first converted pointer value and the second pointer value into a second converted pointer value based on information indicative of parameters of the N-1 symbol stored in the first queue circuit;
outputting, with the first pointer conversion circuit, the first converted pointer value and the second converted pointer value to a second pointer conversion circuit;
receiving, with the second pointer conversion circuit, the first converted pointer value and the second converted pointer value; and converting, with the second pointer conversion circuit, the first converted pointer value into a third converted pointer value and the second converted pointer value into a fourth converted pointer value based on information indicative of parameters of the N-2 symbol stored in the second queue circuit, wherein the third converted pointer value is one of the one or more converted pointer values and the fourth converted pointer value is another one of the one or more converted pointer values, the method further comprising:

outputting, with the memory manager circuit, the values represented by the one or more previous symbols stored in the second set of one or more locations for decoding the current symbol.

19. The method of claim 11, wherein the current symbol comprises a first symbol, method further comprising storing, with one or more queue circuits, information indicative of parameters of the one or more previous symbols, wherein each of the one or more queue circuits is associated with a respective one of the one or more pointer conversion circuits;

outputting, with a hit detection circuit, parameters of the one or more previous symbols from the one or more queue circuit rather than from the history buffer for decoding a second symbol based on the parameters of the one or more previous symbols being values needed to decode the second symbol.

20. The method of claim 11, the method further comprising:

outputting the one or more converted pointer values to a memory manager circuit coupled to the history buffer and the expander circuit;

in parallel with the expander circuit inserting the values represented by the one or more previous symbols into the data stream, retrieving, with the memory manager circuit, the values represented by the one or more previous symbols from the history buffer based on the one or more converted pointer values, wherein inserting, with the expander circuit, the values represented by the one or more previous symbols into the data stream to expand the one or more previous symbols comprises, subsequent to or in parallel with converting the one or more pointer values into the one or more converted pointer values:

receiving, with the expander circuit, the values represented by the one or more previous symbols from the memory manager circuit; and inserting, with the expander circuit, the values represented by the one or more previous symbols into the data stream.

* * * * *